(12) United States Patent
Nozawa

(10) Patent No.: US 7,046,460 B2
(45) Date of Patent: May 16, 2006

(54) IMAGE-FORMATION OPTICAL SYSTEM, AND IMAGING SYSTEM

(75) Inventor: Toshihide Nozawa, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/817,174

(22) Filed: Apr. 5, 2004

(65) Prior Publication Data
US 2004/0196575 A1 Oct. 7, 2004

(30) Foreign Application Priority Data
Apr. 4, 2003 (JP) .............................. 2003-101506

(51) Int. Cl.
*G02B 9/12* (2006.01)
(52) U.S. Cl. ........................ 359/791; 359/784; 359/716
(58) Field of Classification Search ................ 359/784, 359/791, 645, 661, 689, 716
See application file for complete search history.

(56) References Cited

U.S. PATENT DOCUMENTS

| | | | | |
|---|---|---|---|---|
| 4,685,774 A | * | 8/1987 | Moskovich | .................. 359/650 |
| 6,441,971 B1 | * | 8/2002 | Ning | ........................... 359/739 |
| 2004/0179275 A1 | * | 9/2004 | Takeuchi et al. | ............ 359/791 |

FOREIGN PATENT DOCUMENTS

| | | |
|---|---|---|
| JP | 55073014 A | 6/1980 |
| JP | 01-144007 | 6/1989 |
| JP | 1307712 A | 12/1989 |
| JP | 02-191907 | 7/1990 |
| JP | 4016811 | 1/1992 |
| JP | 04-153612 | 5/1992 |
| JP | 05-188284 | 7/1993 |
| JP | 09-288235 | 11/1997 |
| JP | 075006 | 3/2001 |
| JP | 2001 100090 A | 4/2001 |
| JP | 2001 174701 A | 6/2001 |
| JP | 2001183578 A | 6/2001 |

* cited by examiner

*Primary Examiner*—Scott J. Sugarman
*Assistant Examiner*—Darryl J. Collins
(74) *Attorney, Agent, or Firm*—Kenyon & Kenyon LLP

(57) ABSTRACT

The invention relates to an image-formation optical system that satisfies demands toward high performance and compactness at the same time, and an imaging system incorporating the same. The image-formation optical system comprises, in order from its object side, an aperture stop S, a first positive meniscus lens L1 convex on its object side, a second positive lens L2 having an aspheric surface and a third negative lens L3 having an aspheric surface, and satisfies the following condition.

$$0.95 < \Sigma d/f < 1.25 \qquad (1)$$

Here $\Sigma d$ is the distance on an optical axis of the image-formation optical system from the object side-surface of the first positive meniscus lens to the image plane side-surface of the third negative lens, and f is the focal length of the image-formation optical system.

33 Claims, 21 Drawing Sheets

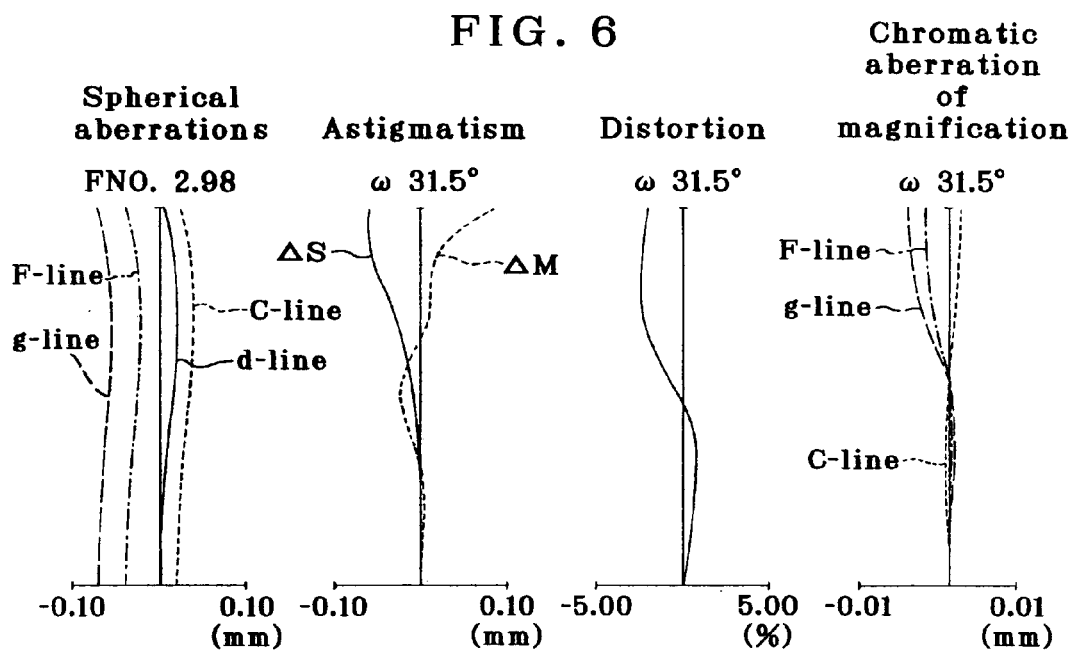
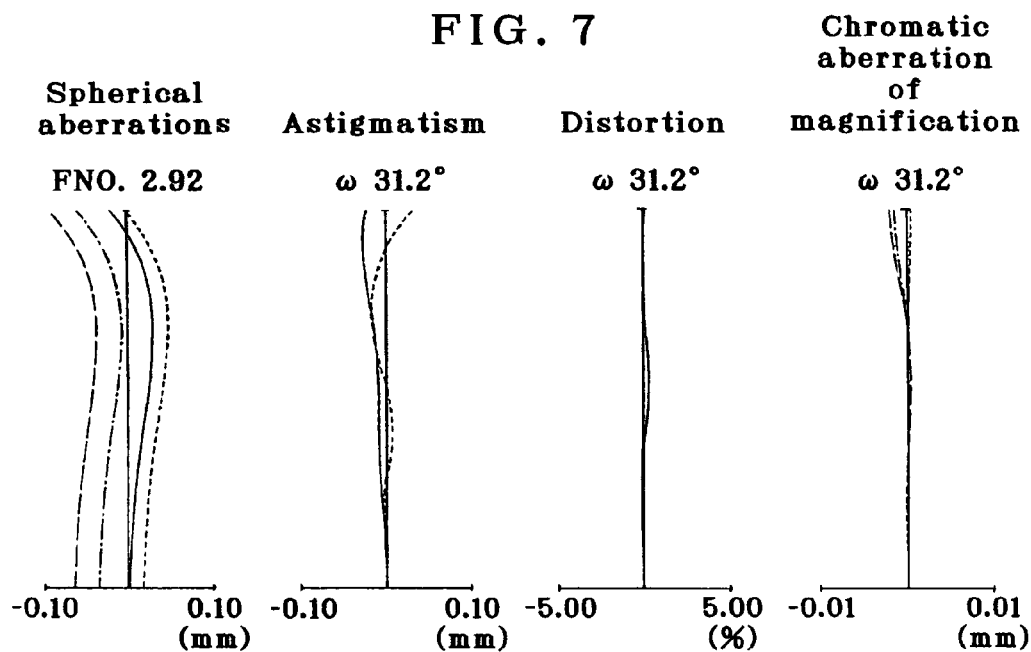

C : Cyan   M : Magenta
Y : Yellow   G : Green

IMAGE-FORMATION OPTICAL SYSTEM, AND IMAGING SYSTEM

This application claims the benefits of Japanese Application No. 2003-101506 filed in Japan on Apr. 4, 2003, the contents of which are incorporated herein by this reference.

BACKGROUND OF THE INVENTION

The present invention relates generally to an image-formation optical system and an imaging system that incorporates the same. More particularly, the invention is concerned with imaging systems such as digital still cameras, digital video cameras harnessing solid-state image pickup devices, e.g., CCDs or CMOSs, and small-format cameras, surveillance cameras that are mounted on cellar phones and personal computers.

In recent years, electronic cameras using solid-stage image pickup devices such as CCDs or CMOSs to take subject images have come into wide use in place of silver-halide cameras. For imaging systems mounted on portable computers, cellular phones, etc. of those electronic cameras, size and weight reductions are especially demanded.

Some conventional image-formation optical systems used with such imaging systems are made up of one or two lenses. With those optical systems, however, any high performance is not expectable because of their inability to correct field curvature, as already known from discussions about aberrations. To achieve high performance, therefore, it is required to use three or more lenses.

A problem with CCDs is, on the other hand, that as off-axis light beams emerging from an image-formation optical system are incident on an image plane at too large an angle, the ability of microlenses to concentrate light does not satisfactorily work, causing the brightness of an image to change noticeably between its central area and its peripheral area. For this reason, the angle of incidence of light rays on the CCD, i.e., the exit pupil position is an important design consideration. For an optical system comprising a limited number of lenses, the position of an aperture stop is of importance.

With those problems in mind, front stop triplet type image-formation lenses have been put forward, as disclosed typically in Patent Publications 1–12.

Patent Publication 1
JP-A 1-144007
Patent Publication 2
JP-A 2-191907
Patent Publication 3
JP-A 4-153612
Patent Publication 4
JP-A 5-188284
Patent Publication 5
JP-A 9-288235
Patent Publication 6
JP-A 2001-75006
Patent Publication 7
JP-A 55-73014
Patent Publication 8
JP-A 1-307712
Patent Publication 9
JP-A 4-16811
Patent Publication 10
JP-A 2001-100090
Patent Publication 11
JP-A 2001-174701
Patent Publication 12
JP-A 2001-183578

However, such prior arts have a lot of problems as described below.

With the optical systems disclosed in Patent Publications 1, 2, 3, 4 and 5, correction of coma and astigmatism due to off-axis light rays is difficult because the first positive lenses are each in a double-convex form. In any case, the half angle of view is limited to about 25°.

With the optical system of Patent Publication 6, such adverse influences as mentioned above are lessened by configuring the first positive lens in a meniscus shape convex on its image side. However, the length of the optical system is still large, failing to achieve significant size reductions.

SUMMARY OF THE INVENTION

In view of such prior art problems as stated above, the primary object of the present invention is to provide an image-formation optical system that makes a sensible tradeoff between enhanced performance and size reductions, and an imaging system that incorporates the same.

According to the present invention, the above object is accomplished by the provision of an image-formation optical system comprising, in order from the object side, an aperture stop, a first positive meniscus lens convex on an object side thereof, a second positive lens having an aspheric surface and a third negative lens having an aspheric surface, characterized in that the total number of lens elements is three.

Actions and advantages of the above arrangement are now explained.

Generally, a triplet type of +−+ construction is known for an imaging optical system comprising three lenses. To make the length of the optical system short, however, such a telephoto type as known from Patent Publication 7 or the like is favorable.

Arrangements comprising two lenses are known for a telephoto type optical system made up of a few lenses, as disclosed in Patent Publication 8, Patent Publication 9 or the like. However, these two-lens optical systems are proposed primarily as phototaking lenses for filmed cameras, and so cannot be applied to digital cameras in view of optical performance.

Patent Publications 10, 11 and 12 propose a two-lens retrofocus type optical system of −+ construction designed to be used on digital cameras or the like. In view of optical performance, however, this can be applied only to digital cameras of the class that comprises 300,000 pixels at most. In addition, the retrofocus type renders it difficult to shorten the length of the optical system.

In accordance with the invention aiming at size reductions by the adoption of the telephoto type, there is provided a lens arrangement of ++− construction that ensures performance enough to be used with 1,000,000 pixel class digital cameras.

To diminish the angle of incidence of light rays on a CCD that is an image pickup device, the aperture stop is located nearest to the object side of the arrangement. In the invention wherein the number of lenses used is reduced, the aperture stop should most effectively be positioned on the object side, although the powers of the lenses should preferably be determined such that the exit pupil is positioned off toward the object side.

The first positive lens is defined by a meniscus lens that has a curved surface of strong positive power on its object side. This enables the principal point of the first positive lens to be moved toward the object side, and so is favorable for shortening the length of the optical system.

The second positive lens and the third negative lens have each an aspheric surface primarily for the purpose of making correction for spherical aberrations at the aspheric surface of the second positive lens and for field curvature and distortion at the aspheric surface of the third negative lens.

Especially with the arrangement wherein the aperture stop is located nearest to the object side or the lenses are found on only one side of the stop, it is difficult to correct the optical system for off-axis aberrations such as field curvature and distortion. However, those off-axis aberrations can be well corrected if both surfaces of the third negative lens are defined by aspheric surfaces.

If the optical system satisfies the following condition, then its length can be made short at a large angle of view.

$$0.95 < \Sigma d/f < 1.25 \quad (1)$$

Here $\Sigma d$ is the distance on the optical axis of the optical system from the object side-surface of the first positive meniscus lens to the image plane side-surface of the third negative lens, and f is the focal length of the optical system.

As the upper limit of 1.25 to condition (1) is exceeded, the optical system becomes long, and as the lower limit of 0.95 is not reached, the focal length of the optical system becomes long with the result that the angle of view becomes narrow.

More preferably, $$0.98 < \Sigma d/f < 1.20 \quad (1\text{-}1)$$

The optical system of the invention should also satisfy the following condition (2) to improve on its performance and reduce its length.

$$0.3 < r_1/f < 0.6 \quad (2)$$

Here $r_1$ is the radius of curvature on the optical axis of the object side-surface of the first positive meniscus lens, and f is the focal length of the optical axis.

As the upper limit of 0.6 to condition (2) is exceeded, or the radius of curvature on the optical axis of the object side-surface of the first positive meniscus lens becomes slacker, the principal point of the first positive meniscus lens is shifted toward the image plane side. This means that in order to shorten the length of the optical system, the power of each lens must be increased, failing to achieve any sufficient performance. Falling short of the lower limit of 0.3 may be favorable for length reductions, but renders it difficult to make correction for spherical aberrations occurring at the object side surface of the first positive meniscus lens.

More preferably, $$0.32 < r_1/f < 0.55 \quad (2\text{-}1)$$

This optical system is of the telephoto type due to the positive power of each of the first positive lens and the second positive lens and the negative power of the third negative lens. Two conditions, given below, are to determine the positive power and negative power of the telephoto type in such a way as to keep length and performance in a well-balanced state.

$$0.5 < |f_{12}/f_3| < 1 \quad (3)$$

$$0.7 < |f_3|/f < 1.8 \quad (4)$$

Here $f_{12}$ is the composite focal length of the first positive meniscus lens and the second positive lens, $f_3$ is the focal length of the third negative lens, and f is the focal length of the optical system.

Any departure from the upper limit of 1 and the lower limit of 0.5 to condition (3) will cause the positive power and the negative power, contributing to the telephoto type, to be thrown off balance, ending up with length increases and underperformance.

Exceeding the upper limit of 1.8 to condition (4) is unfavorable for length reductions, because the negative power contributing to the telephoto type becomes weak. As the lower limit of 0.7 is not reached, the negative power contributing to the telephoto type becomes too strong. This means that the positive power, too, must be increased accordingly, resulting in an increase in aberrations occurring at each lens and difficulty with which performance is ensured.

More preferably, at least one of the following conditions should be satisfied.

$$0.53 < |f_{12}/f_3| < 0.96 \quad (3\text{-}1)$$

$$0.75 < |f_3|/f < 1.3 \quad (4\text{-}1)$$

Incidentally, when a CCD is used as an image pickup device, there is a so-called shading phenomenon where as an off-axis light beam leaving an optical system is incident on an image plane at too large an angle, central and peripheral areas of an image vary in brightness. With the incidence of an off-axial light beam on the image plane at a small angle, this problem is eliminated if not completely; however, there is another problem that the optical system becomes long. Thus, it is preferable for the image-formation optical system to satisfy the following condition.

$$-1 < EXP/f < -0.5 \quad (5)$$

Here EXP is a paraxial exit pupil position as determined on the basis of the image-formation position of the image-formation optical system relative to an object point at infinity, and f is the focal length of the image-formation optical system.

Any departure from the upper limit of $-0.5$ to condition (5) will render the optical system overly long, and any deviation from the lower limit of $-1$ will cause the angle of incidence of light on the CCD to become too large, leading to a drop of the brightness of the peripheral area of the image.

More preferably, $$-0.8 < EXP/f < -0.6 \quad (5\text{-}1)$$

Preferably for the image-formation optical system of the invention, either one or both of the second positive lens having an aspheric surface and the third negative lens having an aspheric surface should be formed of a plastic lens or lenses.

Lenses having refracting power, which form part of the image-formation optical system, should preferably consist of three lenses, i.e., a first positive meniscus lens, a second positive lens and a third negative lens.

The present invention also embraces an electronic imaging system comprising any one of the image-formation optical systems as described above and an electronic image pickup device located on the image side thereof.

Preferably, the electronic imaging system of the invention should satisfy the following condition.

$$55° < 2\omega < 70° \quad (6)$$

Here ω is a half angle of view, and 2ω is a total angle of view.

Falling short of the lower limit of 55° to condition (6) means that the image pickup angle is not very large. On the other hand, exceeding the upper limit of 70° often results in off-axis aberrations that are hardly corrected with a limited number of lenses.

More preferably, $$60° < 2\omega < 67°  \quad (6\text{-}1)$$

The present invention also provides an imaging system comprising an image-formation optical system comprising, in order from an object side thereof, an aperture stop, a first positive meniscus lens convex on its object side, a second positive lens having an aspheric surface and a third negative lens having an aspheric surface, and an image pickup device located on an image side thereof, characterized in that the total of three lens elements are used in said image-formation optical system, and said aperture stop has a fixed shape of aperture through which light rays pass, wherein the outer peripheral surface of said aperture is inclined in such a way as to taper down to an optical axis toward an image plane side.

Actions and advantages of the thus constructed imaging system are now explained. As light reflected at a peripheral surface area of the aperture stop enters the image-formation optical system, some phenomena such as those known as ghosts and flares are likely to occur. Especially on the small-format image-formation optical system of the invention comprising, in order from its object side, the aperture stop, the first positive meniscus lens convex on the object side, the second positive lens having an aspheric surface and the third negative lens having an aspheric surface, light reflected at the peripheral surface area of the aperture stop has relatively large influences, because the image pickup plane of the image pickup device decreases in size, too.

To eliminate or reduce such influences by taking advantage of the arrangement wherein the aperture stop is located nearest to the object side, the aperture stop used herein is of a fixed aperture shape, and the peripheral surface area of the aperture stop is inclined at an angle of inclination larger than the angle of incidence of a farthest off-axis light beam in such a way as to taper down to the optical axis toward the image plane side.

With this arrangement, the light beam reflected at the peripheral surface area of the aperture is less likely to enter the image pickup device, so that the influences of ghosts and flares can be eliminated or reduced.

Further, the present invention provides an imaging system comprising an image-formation optical system comprising, in order from an object side thereof, an aperture stop, a first positive meniscus lens convex on its object side, a second positive lens having an aspheric surface and a third negative lens having an aspheric surface, and an image pickup device located on an image side thereof, characterized by further comprising a lens barrel for holding said image-formation optical system and said image pickup device, wherein said aperture stop is formed integrally of the same resin of which said lens barrel is formed.

Actions and advantages of the thus constructed imaging system are now explained. In the imaging system of the invention, the aperture stop is located nearest to the object side of the image-formation optical system. The nearer a lens is positioned to the image side, the larger the effective surface of that lens becomes. Thus, if the lens barrel for holding those lenses is made up of the same, easy-to-mold resin, the respective lenses can then be inserted into the barrel from its image plane side for lens alignment, facilitating fabrication.

If, in this case, the aperture stop is integrated with the lens barrel, it is then possible to substantially cut off fabrication process steps. Further, if the lens barrel itself is permitted to have an image pickup device retaining function, it is then possible to make dust less likely to enter the barrel.

Still further, the present invention provides an imaging system comprising an image-formation optical system comprising, in order from an object side of said image-formation optical system, an aperture stop, a first positive meniscus lens convex on an object side thereof, a second positive lens having an aspheric surface and a third negative lens having an aspheric surface, and an image pickup device located on an image side thereof, characterized in that a lens barrel is provided for holding said image-formation optical system, and a peripheral surface of at least said third negative lens is inclined in such a way as to taper down to an optical axis toward the object side for abutment on said lens barrel.

Actions and advantages of the thus constructed imaging system are now explained. In the imaging system of the invention, the aperture stop is located nearest to the object side of the image-formation optical system. The nearer a lens is positioned to the image side, the larger the effective surface of that lens becomes. This is particularly true of the third negative lens. According to this arrangement, the lens contour conforms to off-axis light beams so that the optical system can be slimmed down while reducing shading. By inserting the respective lenses in the lens barrel from its image plane side, they can be so aligned that the optical system can be easily fabricated.

It is again preferable that the peripheral surface of the first positive meniscus lens is inclined in such a way as to taper down to the optical axis toward the object side, while abutting on the lens barrel.

It is noted that the "peripheral surface" used herein means an outer peripheral surface sandwiched between the entrance surface side edge of a lens and the exit surface side edge of the lens.

Still further, the present invention provides an imaging system comprising an image-formation optical system comprising, in order from an object side of said image-formation optical system, an aperture stop, a first positive meniscus lens convex on an object side thereof, a second positive lens having an aspheric surface and a third negative lens having an aspheric surface, and an image pickup device located on an image side thereof, characterized in that a lens barrel is provided for holding said image-formation optical system, said first positive meniscus lens takes on a circular shape as viewed from an entrance side of said imaging system, and said third negative lens is configured such that, as viewed from the entrance side of said imaging system, the length thereof in a direction corresponding to the short-side direction of the effective image pickup area of said image pickup device is shorter than the length thereof in a direction corresponding to the long-side direction of the effective image pickup device.

Actions and advantages of the thus constructed imaging system are now explained. In the imaging system of the invention, the aperture stop is located nearest to the object side of the image-formation optical system. The nearer a lens is positioned to the image side, the larger the effective surface of that lens becomes, and the closer the shape of an effective light beam becomes to that of the effective image pickup area of the image pickup device toward the image plane side. Thus, the above arrangement permits the lens contour to conform to the effective light beam, so that the optical system can be slimmed down while shading is reduced.

It is noted that the lower or upper limit of each main condition could be defined by the lower or upper limit of the subordinate condition.

It is also noted that the advantages of the invention are much more enhanced by combinations of the respective conditions as described above.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 6 is an aberration diagram for Example 1 upon focused on an object point at infinity.

FIG. 7 is an aberration diagram for Example 2 upon focused on an object point at infinity.

DESCRIPTION OF THE PREFERRED EMBODIMENTS

The image-formation optical system of the invention is now explained with reference to Examples 1 to 5. FIGS. 1–5 are illustrative in section of the lens arrangements in Examples 1–5 upon focused on an object point at infinity. In those figures, S represents an aperture stop, L1 a first positive lens, L2 a second positive lens, L3 a third negative lens, CG a cover glass for an electronic image pickup device, and I an image plane. It should be appreciated that the cover glass CG may be provided on its surface with a frequency region-limiting multilayer coating, and is still allowed to have a low-pass filter function.

EXAMPLE 1

Figure 1:
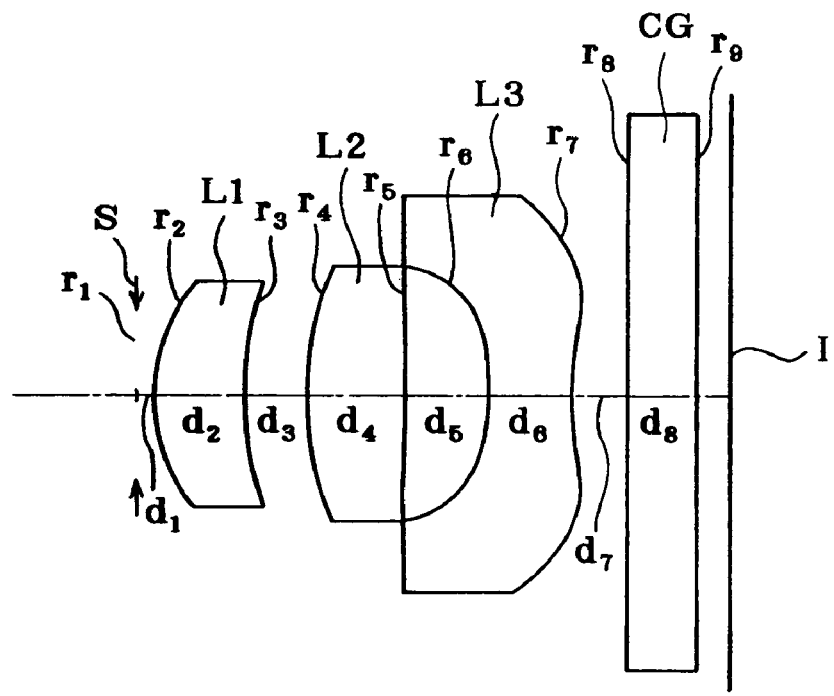
FIG. 1 is illustrative in section of the lens arrangement in Example 1 of the image-formation optical system of the invention upon focused on an object point at infinity.

Example 1 is directed to an image-formation optical system that is made up of, in order from its object side, an aperture stop S, a first positive meniscus lens L1 that is convex on its object side and has an aspheric surface on its object side, a second, double-convex positive lens L2 that has an aspheric surface on its image plane side, a third, double-concave negative lens L3 that has aspheric surfaces on both its sides, and a cover glass CG, as shown in FIG. 1. The first lens L1, second lens L2 and third lens L3 are all formed of plastics.

The specifications for the image-formation optical system according to this example are:

focal length f=3.83 mm,
image height=2.30 mm,

F-number=2.98, and
total angle of view 2ω=63.0°.

EXAMPLE 2

Figure 2:
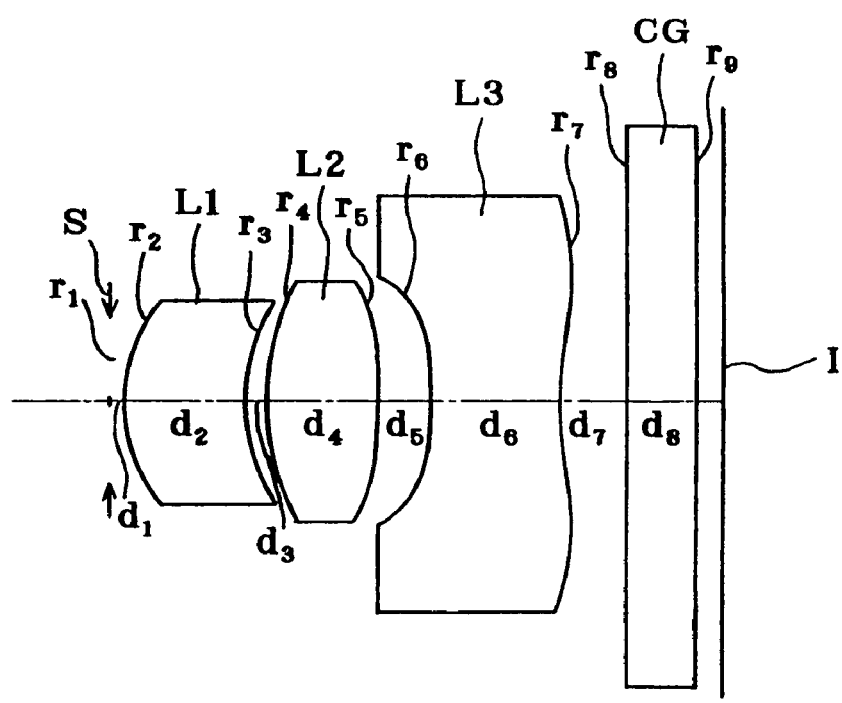
FIG. 2 is a sectional view, similar to FIG. 1, of the lens arrangement in Example 2 of the image-formation optical system according to the invention.

Example 2 is directed to an image-formation optical system that is made up of, in order from its object side, an aperture stop S, a first positive meniscus lens L1 that is convex on its object side and has an aspheric surface on its object side, a second, double-convex positive lens L2 that has an aspheric surface on its image plane side, a third, double-concave negative lens L3 that has aspheric surfaces on both its sides, and a cover glass CG, as shown in FIG. 2. The first lens L1, second lens L2 and third lens L3 are all formed of plastics.

The specifications for the image-formation optical system according to this example are:
focal length f=3.79 mm,
image height=2.30 mm,
F-number=2.92, and
total angle of view 2ω=62.4°.

EXAMPLE 3

Figure 3:
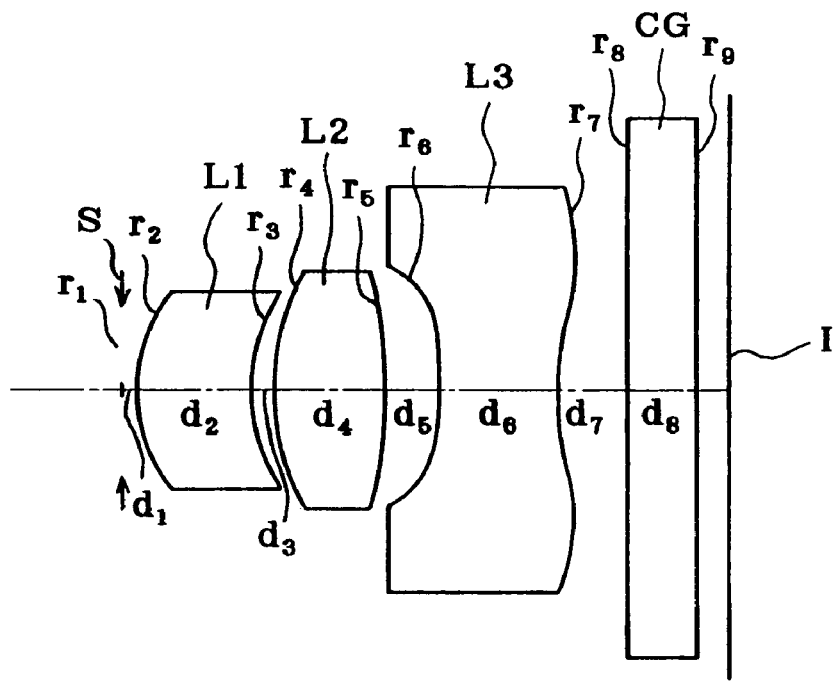
FIG. 3 is a sectional view, similar to FIG. 1, of the lens arrangement in Example 3 of the image-formation optical system according to the invention.

Example 3 is directed to an image-formation optical system that is made up of, in order from its object side, an aperture stop S, a first positive meniscus lens L1 that is convex on its object side and has an aspheric surface on its object side, a second, double-convex positive lens L2 that has an aspheric surface on its image plane side, a third, double-concave negative lens L3 that has aspheric surfaces on both its sides, and a cover glass CG, as shown in FIG. 3. The first lens L1, second lens L2 and third lens L3 are all formed of plastics.

The specifications for the image-formation optical system according to this example are:
focal length f=3.85 mm,
image height=2.30 mm,
F-number=2.96, and
total angle of view 2ω=61.7°.

EXAMPLE 4

Figure 4:
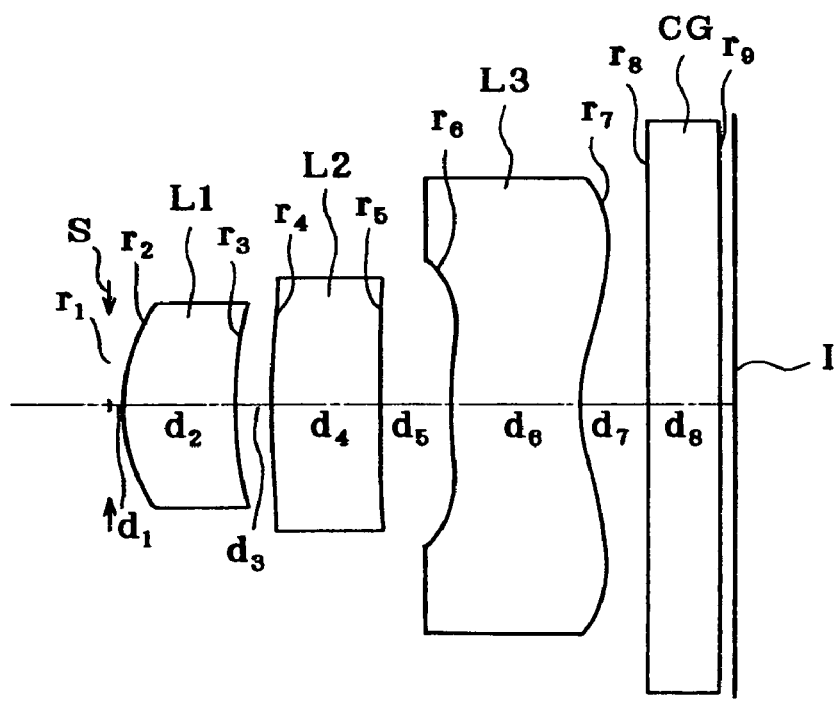
FIG. 4 is a sectional view, similar to FIG. 1, of the lens arrangement in Example 4 of the image-formation optical system according to the invention.

Example 4 is directed to an image-formation optical system that is made up of, in order from its object side, an aperture stop S, a first positive meniscus lens L1 that is convex on its object side, a second positive meniscus lens L2 that is convex on its object side and has aspheric surfaces on both its sides, a third negative meniscus lens L3 that is convex on its object side and has aspheric surfaces on both its sides, and a cover glass CG, as shown in FIG. 4. The first lens L1 is formed of glass, and both the second lens L2 and third lens L3 are formed of plastics.

The specifications for the image-formation optical system according to this example are:
focal length f=3.83 mm,
image height=2.30 mm,
F-number=2.74, and
total angle of view 2ω=61.8°.

EXAMPLE 5

Figure 5:
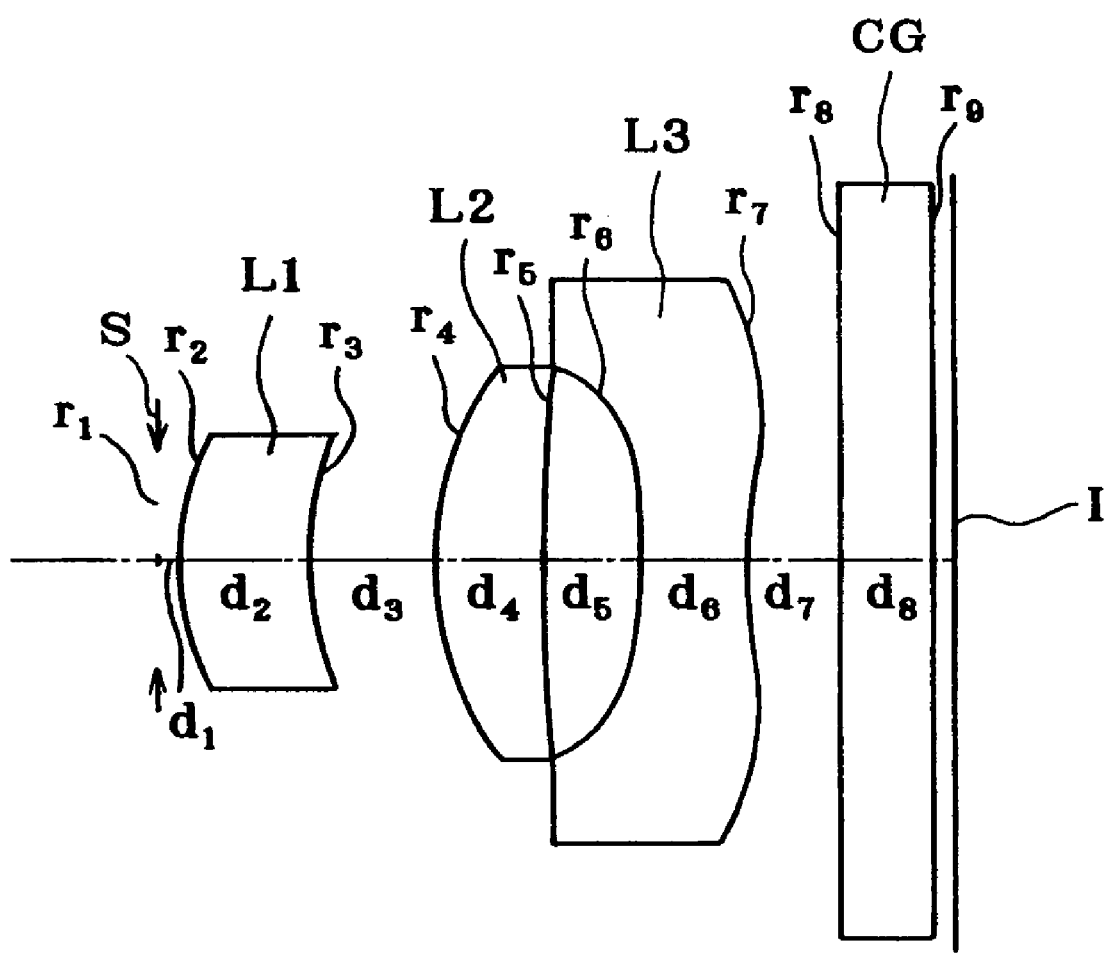
FIG. 5 is a sectional view, similar to FIG. 1, of the lens arrangement in Example 5 of the image-formation optical system according to the invention.
Figure 8:
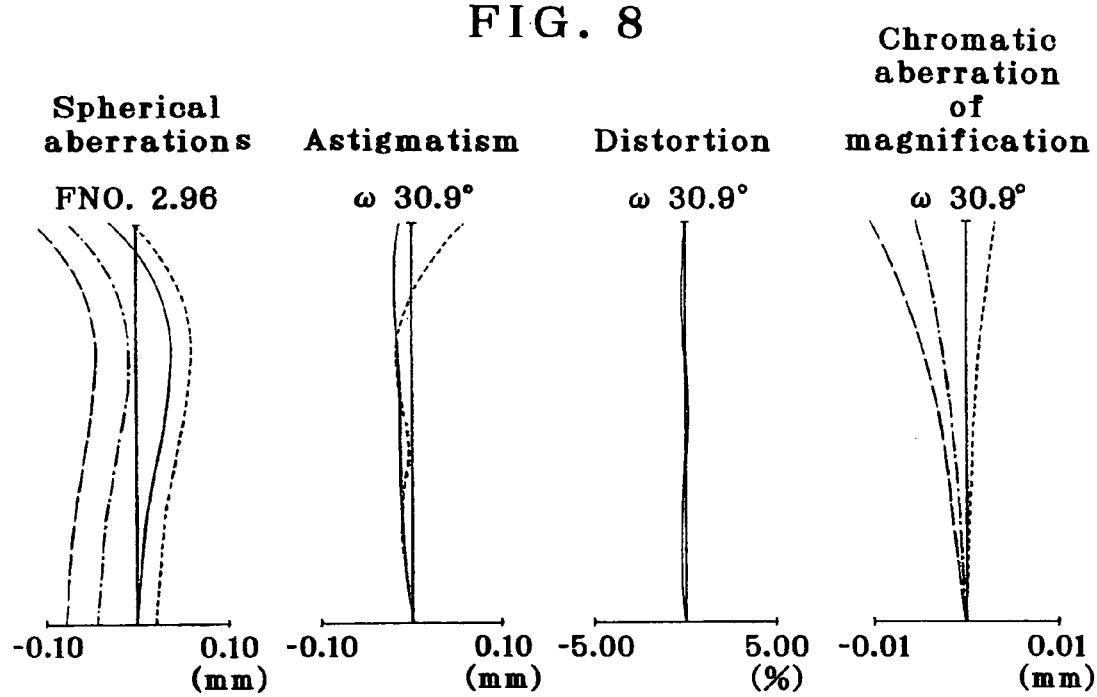
FIG. 8 is an aberration diagram for Example 3 upon focused on an object point at infinity.
Figure 9:
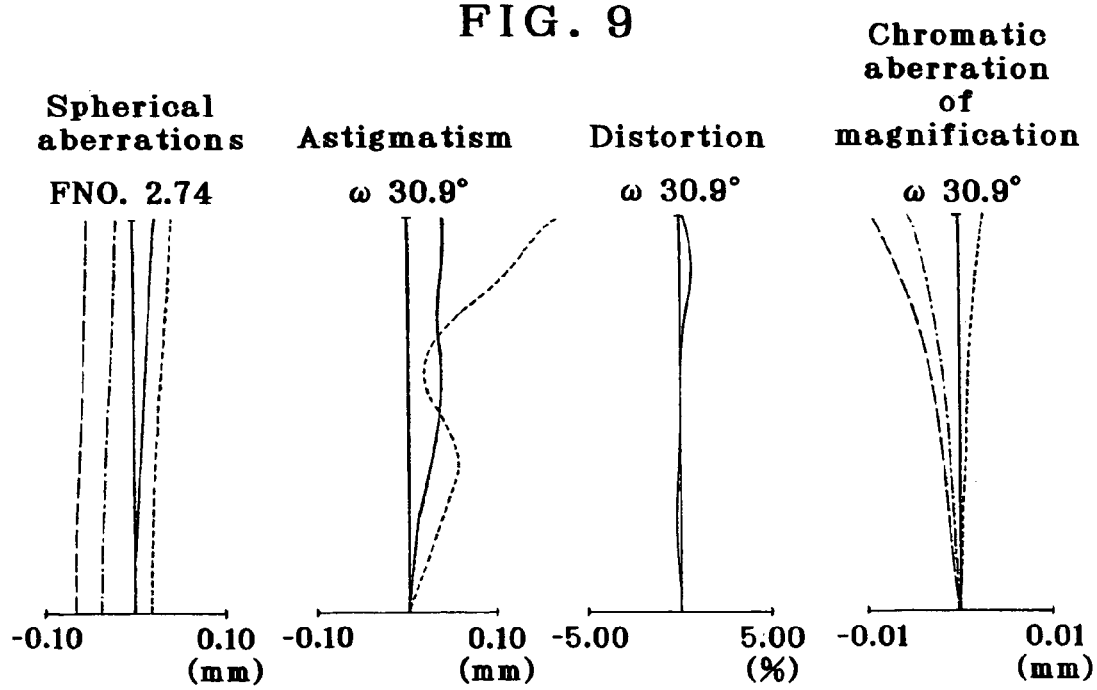
FIG. 9 is an aberration diagram for Example 4 upon focused on an object point at infinity.
Figure 10:
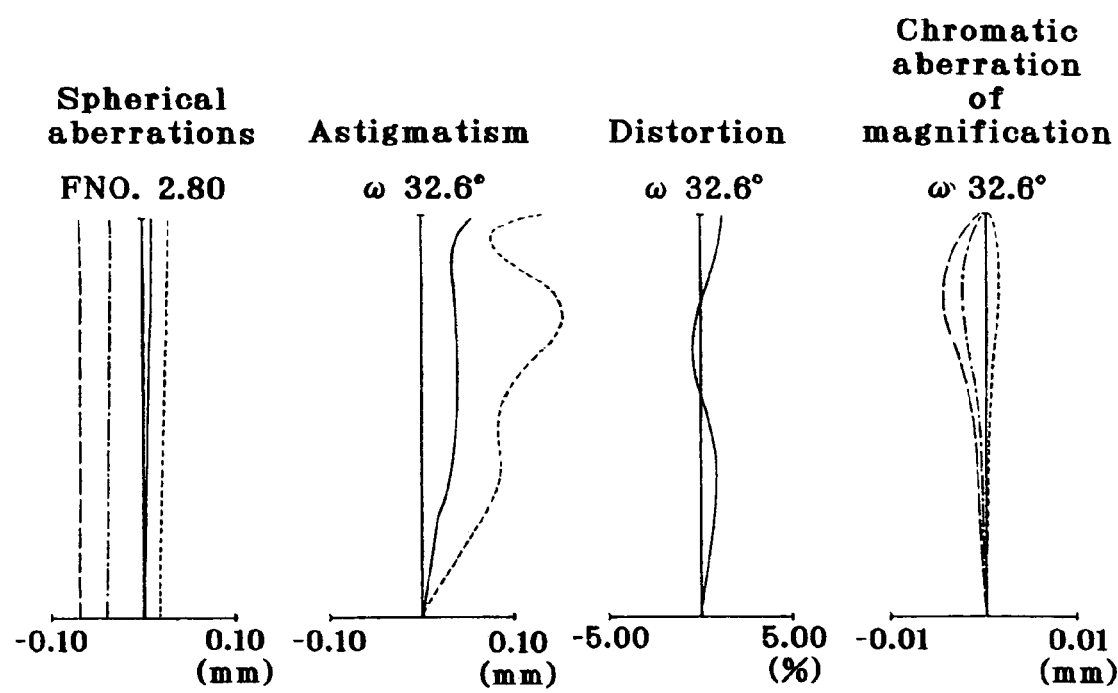
FIG. 10 is an aberration diagram for Example 5 upon focused on an object point at infinity.

Example 5 is directed to an image-formation optical system that is made up of, in order from its object side, an aperture stop S, a first positive meniscus lens L1 that is convex on its object side, a second, double-convex positive lens L2 that has an aspheric surfaces on an image plane side, a third, double-concave negative lens L3 that has aspheric surfaces on both its sides, and a cover glass CG, as shown in FIG. 5. The first lens L1 is formed of glass, and both the second lens L2 and third lens L3 are formed of plastics.

The specifications for the image-formation optical system according to this example are:
focal length f=3.55 mm,
image height=2.30 mm,
F-number=2.80, and
total angle of view 2ω=65.2°.

The numerical data on each example are given below. Symbols used hereinafter but not hereinbefore have the following meanings:

$r_1, r_2, \ldots$ : radius of curvature of each lens surface
$d_1, d_2, \ldots$ : spacing between adjacent lens surfaces
$n_{d1}, n_{d2}, \ldots$ : d-line refractive index of each lens
$\nu_{d1}, \nu_{d2}, \ldots$ : Abbe number of each lens Here let x be an optical axis on condition that the direction of propagation of light is positive and y be a direction orthogonal to the optical axis. Then, aspheric configuration is given by $$x=(y^2/r)/[1+\{1-(K+1)(y/r)^2\}^{1/2}]+A_4y^4+A_6y^6+A_8y^8$$

where r is a paraxial radius of curvature, K is a conical coefficient, and $A_4$, $A_6$ and $A_8$ are the fourth, sixth and eighth aspheric coefficients, respectively.

EXAMPLE 1

| | | | | |
|---|---|---|---|---|
| $r_1 =$ | ∞ (Stop) | $d_1 = 0.10$ | | |
| $r_2 =$ | 1.365 (Aspheric) | $d_2 = 0.63$ | $n_{d1} = 1.50913$ | $\nu_{d1} = 56.20$ |
| $r_3 =$ | 2.622 | $d_3 = 0.46$ | | |
| $r_4 =$ | 2.750 | $d_4 = 0.70$ | $n_{d2} = 4.50913$ | $\nu_{d2} = 56.20$ |
| $r_5 =$ | −47.775 (Aspheric) | $d_5 = 0.60$ | | |
| $r_6 =$ | −5.474 (Aspheric) | $d_6 = 0.62$ | $n_{d3} = 1.57268$ | $\nu_{d3} = 33.51$ |
| $r_7 =$ | 2.645 (Aspheric) | $d_7 = 0.40$ | | |
| $r_8 =$ | ∞ | $d_8 = 0.50$ | $n_{d4} = 1.51633$ | $\nu_{d4} = 64.14$ |
| $r_9 =$ | ∞ | | | |

Aspherical Coefficients
2 nd surface
K=−0.664
$A_4$=7.93801×10$^{-3}$
$A_6$=1.59402×10$^{-2}$
$A_8$=−2.69710×10$^{-3}$
5 th surface
K=612.567
$A_4$=−2.69780×10$^{-2}$
$A_6$=−1.22057×10$^{-2}$
$A_8$=4.19450×10$^{-2}$
6 th surface
K=−43.850
$A_4$=−4.22561×10$^{-1}$
$A_6$=−5.25463×10$^{-2}$
$A_8$=−7.90009×10$^{-2}$
7 th surface
K=0.000
$A_4$=−2.59494×10$^{-1}$
$A_6$=5.15201×10$^{-2}$
$A_8$=−4.92327×10$^{-3}$

EXAMPLE 2

| | | | | | |
|---|---|---|---|---|---|
| $r_1 =$ | ∞ (Stop) | $d_1 = 0.10$ | | | |
| $r_2 =$ | 1.313 (Aspheric) | $d_2 = 0.84$ | $n_{d1} = 1.50913$ | $\nu_{d1} = 56.20$ | |
| $r_3 =$ | 1.488 | $d_3 = 0.14$ | | | |
| $r_4 =$ | 2.106 | $d_4 = 0.80$ | $n_{d2} = 1.50913$ | $\nu_{d2} = 56.20$ | |
| $r_5 =$ | −5.751 (Aspheric) | $d_5 = 0.38$ | | | |
| $r_6 =$ | −11.293 (Aspheric) | $d_6 = 0.93$ | $n_{d3} = 1.57268$ | $\nu_{d3} = 33.51$ | |
| $r_7 =$ | 2.159 (Aspheric) | $d_7 = 0.50$ | | | |
| $r_8 =$ | ∞ | $d_8 = 0.50$ | $n_{d4} = 1.51633$ | $\nu_{d4} = 64.14$ | |
| $r_9 =$ | ∞ | | | | |

Aspherical Coefficients
2 nd surface
$K=0.000$
$A_4=-3.44484\times10^{-2}$
$A_6=-5.44446\times10^{-5}$
$A_8=0$
5 th surface
$K=4.258$
$A_4=-1.33824\times10^{-1}$
$A_6=4.38330\times10^{-2}$
$A_8=0$
6 th surface
$K=0.000$
$A_4=-3.99293\times10^{-1}$
$A_6=2.75894\times10^{-2}$
$A_8=-5.61639\times10^{-2}$
7 th surface
$K=-16.238$
$A_4=-7.90754\times10^{-2}$
$A_6=1.64359\times10^{-2}$
$A_8=-1.28594\times10^{-3}$

EXAMPLE 3

| | | | | | |
|---|---|---|---|---|---|
| $r_1 =$ | ∞ (Stop) | $d_1 = 0.10$ | | | |
| $r_2 =$ | 1.295 (Aspheric) | $d_2 = 0.81$ | $n_{d1} = 1.50913$ | $\nu_{d1} = 56.20$ | |
| $r_3 =$ | 1.468 | $d_3 = 0.15$ | | | |
| $r_4 =$ | 2.126 | $d_4 = 0.83$ | $n_{d2} = 1.50913$ | $\nu_{d2} = 56.20$ | |
| $r_5 =$ | −6.380 (Aspheric) | $d_5 = 0.38$ | | | |
| $r_6 =$ | −10.735 (Aspheric) | $d_6 = 0.90$ | $n_{d3} = 1.50913$ | $\nu_{d3} = 56.20$ | |
| $r_7 =$ | 1.967 (Aspheric) | $d_7 = 0.50$ | | | |
| $r_8 =$ | ∞ | $d_8 = 0.50$ | $n_{d4} = 1.51633$ | $\nu_{d4} = 64.14$ | |
| $r_9 =$ | ∞ | | | | |

Aspherical Coefficients
2 nd surface
$K=0.000$
$A_4=-3.71837\times10^{-2}$
$A_6=7.63558\times10^{-3}$
$A_8=0$
5 th surface
$K=-5.446$
$A_4=-1.27985\times10^{-1}$
$A_6=5.14883\times10^{-2}$
$A_8=0$
6 th surface
$K=0.000$
$A_4=-4.20900\times10^{-1}$
$A_6=3.44052\times10^{-2}$
$A_8=-5.77484\times10^{-2}$
7 th surface
$K=-13.683$
$A_4=-8.08690\times10^{-2}$
$A_6=1.71290\times10^{-2}$
$A_8=-1.33388\times10^{-3}$

EXAMPLE 4

| | | | | | |
|---|---|---|---|---|---|
| $r_1 =$ | ∞ (Stop) | $d_1 = 0.10$ | | | |
| $r_2 =$ | 1.564 | $d_2 = 0.80$ | $n_{d1} = 1.56384$ | $\nu_1 = 60.67$ | |
| $r_3 =$ | 3.773 | $d_3 = 0.24$ | | | |
| $r_4 =$ | 7.599 (Aspheric) | $d_4 = 0.80$ | $n_{d2} = 1.50913$ | $\nu_{d2} = 56.20$ | |
| $r_5 =$ | 14.647 (Aspheric) | $d_5 = 0.52$ | | | |
| $r_6 =$ | 2.891 (Aspheric) | $d_6 = 0.96$ | $n_{d3} = 1.50913$ | $\nu_{d3} = 56.20$ | |
| $r_7 =$ | 1.382 (Aspheric) | $d_7 = 0.50$ | | | |
| $r_8 =$ | ∞ | $d_8 = 0.50$ | $n_{d4} = 1.51633$ | $\nu_{d4} = 64.14$ | |
| $r_9 =$ | ∞ | | | | |

Aspherical Coefficients
4 th surface
$K=-109.458$
$A_4=-2.05429\times10^{-2}$
$A_6=0$
$A_8=0$
5 th surface
$K=-1000.000$
$A_4=-7.44229\times10^{-2}$
$A_6=7.88033\times10^{-2}$
$A_8=0$
6 th surface
$K=1.208$
$A_4=-3.88181\times10^{-1}$
$A_6=1.90917\times10^{-1}$
$A_8=-7.73931\times10^{-2}$
7 th surface
$K=-7.065$
$A_4=-8.13811\times10^{-2}$
$A_6=2.21922\times10^{-2}$
$A_8=-3.71919\times10^{-3}$

EXAMPLE 5

| | | | | | |
|---|---|---|---|---|---|
| $r_1 =$ | ∞ (Stop) | $d_1 = 0.10$ | | | |
| $r_2 =$ | 1.781 | $d_2 = 0.70$ | $n_{d1} = 1.77250$ | $\nu_{d1} = 49.60$ | |
| $r_3 =$ | 2.507 | $d_3 = 0.66$ | | | |
| $r_4 =$ | 2.129 | $d_4 = 0.60$ | $n_{d2} = 1.50913$ | $\nu_{d2} = 56.20$ | |
| $r_5 =$ | −43.514 (Aspheric) | $d_5 = 0.51$ | | | |
| $r_6 =$ | −17.179 (Aspheric) | $d_6 = 0.60$ | $n_{d3} = 1.57268$ | $\nu_{d3} = 33.51$ | |
| $r_7 =$ | 2.468 (Aspheric) | $d_7 = 0.50$ | | | |
| $r_8 =$ | ∞ | $d_8 = 0.50$ | $n_{d4} = 1.51633$ | $\nu_{d4} = 64.14$ | |
| $r_9 =$ | ∞ | | | | |

Aspherical Coefficients
5 th surface
$K=1000.000$
$A_4=7.54185\times10^{-2}$
$A_6=-2.75072\times10^{-2}$
$A_8=0$
6 th surface
$K=-1000.000$
$A_4=-2.70404\times10^{-1}$
$A_6=8.62262\times10^{-2}$
$A_8=-4.41128\times10^{-2}$
7 th surface K=0.000
$A_4=-1.98374\times10^{-1}$
$A_6=4.98813\times10^{-2}$
$A_8=-5.21494\times10^{-3}$ FIGS. 6 to 10 are aberration diagrams indicative of spherical aberrations, comae, distortions and chromatic aberrations of magnification in Examples 1 to 5 upon focused on an infinite object point.

The image-formation optical system according to each of the above examples is of a small size, and still creates images of good quality.

Set out below are the values of conditions (1) to (6) in each of the above examples.

| Condition | Ex. 1 | Ex. 2 | Ex. 3 | Ex. 4 | Ex. 5 |
|---|---|---|---|---|---|
| (1) | 1.02 | 1.08 | 1.06 | 1.13 | 1.15 |
| (2) | 0.36 | 0.35 | 0.34 | 0.41 | 0.50 |
| (3) | 0.93 | 0.90 | 0.89 | 0.56 | 0.76 |
| (4) | 0.79 | 0.81 | 0.83 | 1.73 | 1.05 |
| (5) | −0.64 | −0.65 | −0.65 | −0.63 | −0.72 |
| (6) | 63.0° | 62.4° | 61.7° | 61.8° | 65.2° |

Throughout the above examples of the invention, the aspheric surfaces are all made up of plastics; however, it is understood that they may be made up of glass. For instance, much higher performance could be achieved by use of glass having a refractive index higher than that of the plastic material used in any of the above examples. Likewise, the use of special low-dispersion glass could be more effective at correction of chromatic aberrations. The use of a plastic material of low hygroscopicity is particularly preferable because degradation of performance due to environmental changes is substantially reduced (for instance, Zeonex made by Nippon Zeon Co., Ltd.).

With a view to cutting off unnecessary light such as ghosts and flares, it is acceptable to rely upon a flare stop in addition to the aperture stop S. For instance, that flare stop may be interposed at any desired position between the aperture stop S and the first lens L1, the first lens L1 and the second lens L2, the second lens L2 and the third lens L3, and the third lens L3 and the image plane I. Alternatively, the lens barrel may be used to cut off flare light rays or another member may be used as the flare stop. Such flare stops may be obtained by direct printing, coating, seal bonding on the optical system, etc., and configured in any desired form such as circular, oval, rectangular, polygonal forms or forms surrounded with functional curves. The flare stop used may be designed to cut off not only harmful light beams but also light beams such as coma flare around the screen.

Each lens may have been provided with an antireflection coating for the purpose of reducing ghosts and flares. Multicoatings are preferred because of having the ability to reduce ghosts and flares effectively. Alternatively, infrared cut coatings may have been applied on lens surfaces, cover glass surfaces or the like.

Focus adjustment may be carried out by focusing. Focusing may be performed by moving the whole lenses or extending or retracting some lenses.

A drop, if any, of brightness of the peripheral area of an image may be reduced by the shifting of the CCD microlenses. For instance, the design of CCD microlenses may be changed in association with the angle of incidence of light rays at each image height, or decreases in the quantity of light at the peripheral area of the image may be corrected by image processing.

Figure 11:
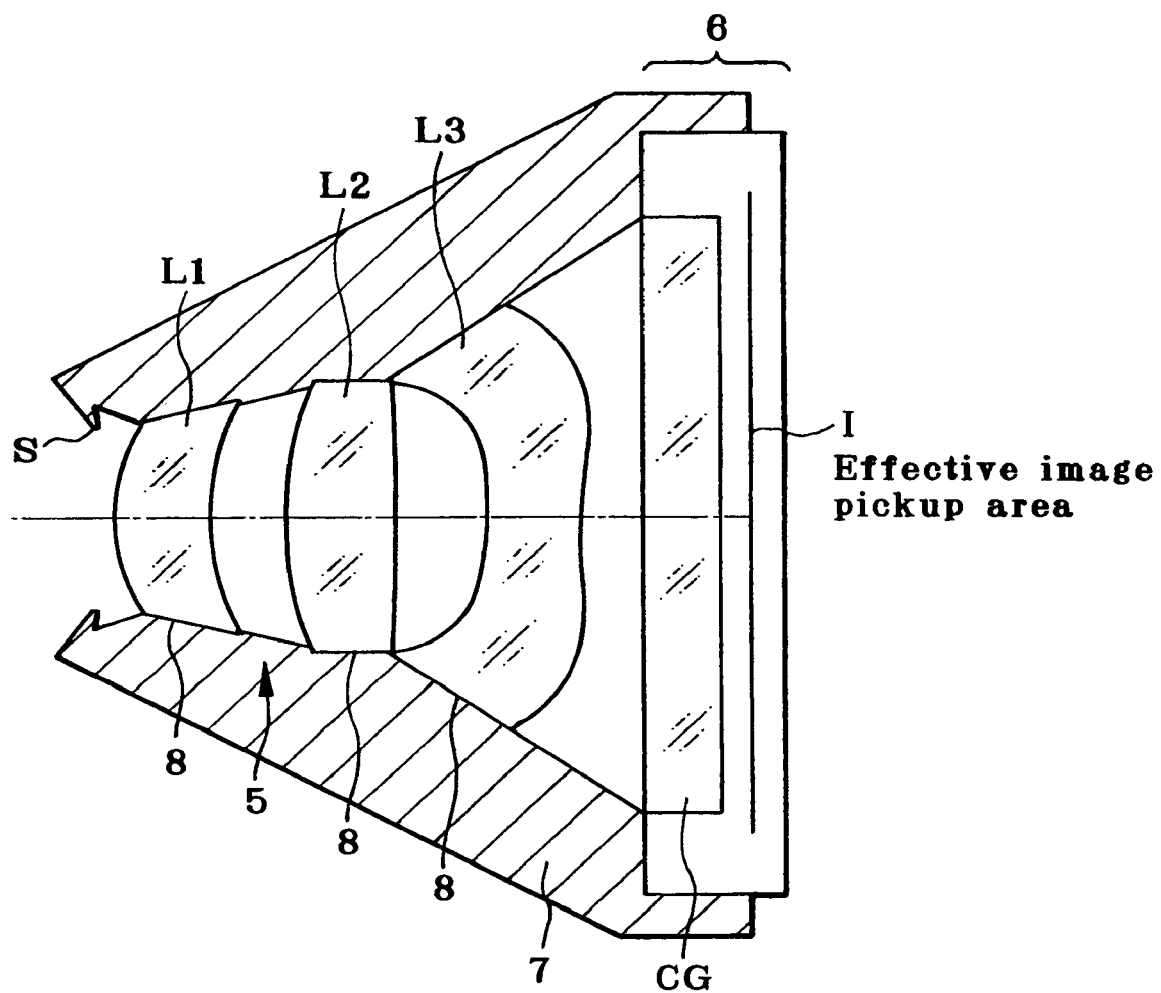
FIG. 11 is illustrative in section of one embodiment of the invention wherein the image-formation optical system of Example 1 and a CCD located on its image plane are fixed to a lens barrel obtained by integral molding of a resin material.

FIG. 11 is illustrative of one embodiment of the invention wherein an image-formation optical system 5 according to Example 1 and a CCD unit 6 located at an image plane I thereof are fixed to a lens barrel 7 obtained by integral molding of a resin material; FIG. 11 is a sectional view of that embodiment including the optical axis of the image-formation optical system 5, as taken along the diagonal direction of the image plane I of the CCD unit 6. As shown, an aperture stop S is attached to the lens barrel 7 by integral molding, so that the lens barrel 7 for holding the image-formation optical system 5 can be easily fabricated. Integral incorporation of the aperture stop S in the lens barrel 7 considerably cuts back on fabrication steps, and providing the lens barrel 7 with a function of holding the CCD unit 6 comprising a CCD as an image pickup device prevents entrance of dust, etc. in the lens barrel 7.

As can be seen from FIG. 11, the peripheral surface 8 of each of the first positive lens L1 and the third negative lens L3 in the image-formation optical system 5 is inclined in such a way as to taper down to the optical axis toward the object side, so that the tapering surface can be fixed to the lens barrel 7 while abutting thereon. Thus, the lenses L1 and L2 can be fitted from the image plane side in the lens barrel 7, so that they can be positioned in alignment.

Figure 12:
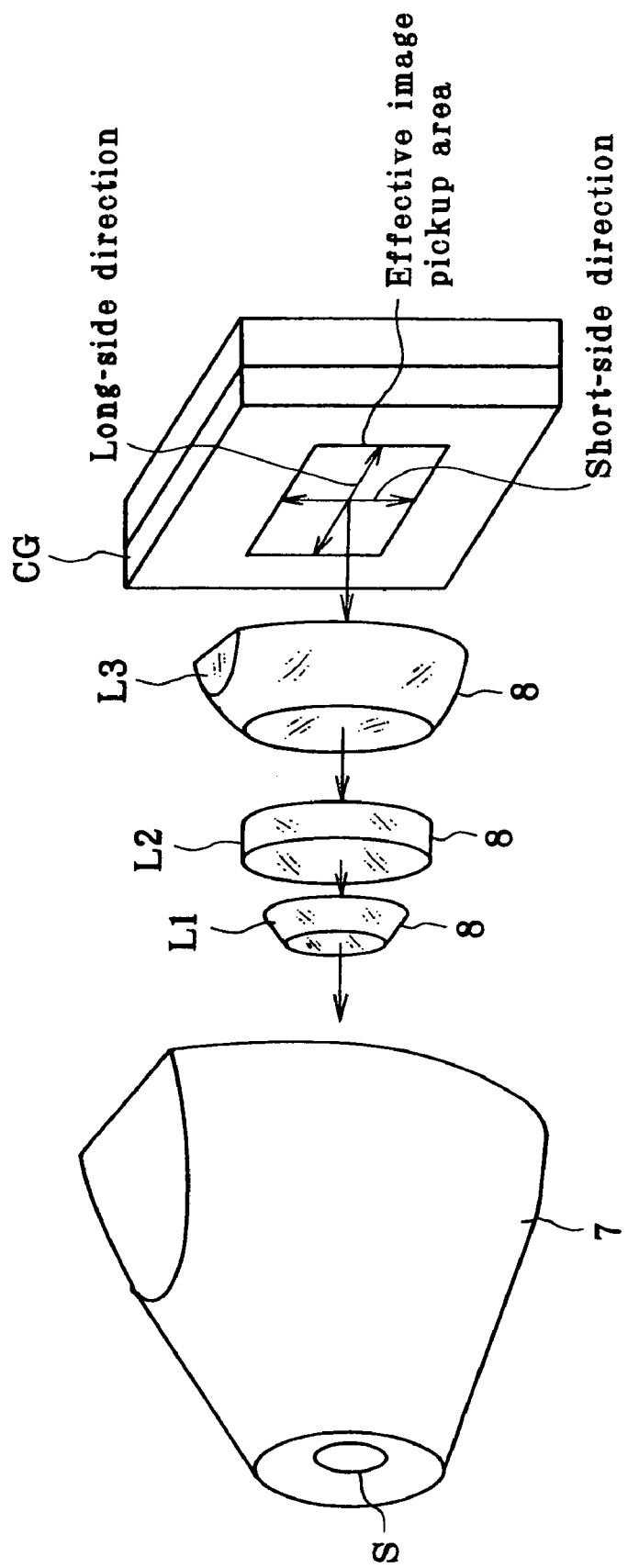
FIG. 12 is a schematic, exploded view of the image-formation optical system wherein the third negative lens is in an oval form.

As shown in the schematic exploded perspective view of FIG. 12, the first positive lens L1 and the second positive lens L2 in the image-formation optical system retained in the lens barrel 7 molded of plastics are each of a circular shape, and the third negative lens L3 is of an oval shape wherein the uppermost and lowermost portions of a circle are cut out, as viewed from the entrance side of the imaging system. As shown, the peripheral surfaces 8 of the first positive lens L1 and the third negative lens L3 taper down toward the aperture stop S side. The inner surface of the lens barrel 7 is inclined in association with those tapering surfaces, too.

Thus, the first positive lens L1 is configured to be circular as viewed from the entrance side of the imaging system, and the third negative lens L3 is configured such that, as viewed from the entrance side, its length in the direction corresponding to the short-side direction of the effective image pickup area of the image pickup device CCD is shorter than its length in the direction corresponding to the long-side direction of the effective image pickup area, so that the contours of the first positive lens L1, the second positive lens L2 and the third negative lens L3 in the image-formation lens system can conform to an effective light beam. In this embodiment, too, the tapering peripheral surface 8 of each of the first positive lens L1 and the third negative lens L3 in the image-formation optical system 5 is fixed to the inner surface of the lens barrel 7 while abutting thereon, so that the lenses L1 and L3 can be fitted from the image plane side in the lens barrel 7 and positioned in alignment.

As shown in the sectional view of FIG. 11, it is desired that the peripheral surface of the aperture in the aperture stop S be inclined with respect to the lens L1 side, so that the corner of that peripheral surface having an angle of inclination larger than that of the effective light beam and substantially nearest to the lens side can act as a stop. Thus, a light beam reflected at the peripheral surface of the aperture in the aperture stop S is less likely to enter the image pickup device CCD, thereby making it possible to lessen the influences of ghosts and flares.

In each example, the cover glass CG may be provided with a near-infrared sharp cut coat on its entrance surface side. This near-infrared sharp cut coat is designed to have a transmittance of at least 80% at 600 nm wavelength and a transmittance of up to 10% at 700 nm wavelength. More specifically, the near-infrared sharp cut coat has a multilayer structure made up of such 27 layers as mentioned below provided that the design wavelength is 780 nm.

| Substrate | Material | Physical Thickness (nm) | λ/4 |
|---|---|---|---|
| 1st layer | $Al_2O_3$ | 58.96 | 0.50 |
| 2nd layer | $TiO_2$ | 84.19 | 1.00 |
| 3rd layer | $SiO_2$ | 134.14 | 1.00 |
| 4th layer | $TiO_2$ | 84.19 | 1.00 |
| 5th layer | $SiO_2$ | 134.14 | 1.00 |
| 6th layer | $TiO_2$ | 84.19 | 1.00 |
| 7th layer | $SiO_2$ | 134.14 | 1.00 |
| 8th layer | $TiO_2$ | 84.19 | 1.00 |
| 9th layer | $SiO_2$ | 134.14 | 1.00 |
| 10th layer | $TiO_2$ | 84.19 | 1.00 |
| 11th layer | $SiO_2$ | 134.14 | 1.00 |
| 12th layer | $TiO_2$ | 84.19 | 1.00 |
| 13th layer | $SiO_2$ | 134.14 | 1.00 |
| 14th layer | $TiO_2$ | 84.19 | 1.00 |
| 15th layer | $SiO_2$ | 178.41 | 1.33 |
| 16th layer | $TiO_2$ | 101.03 | 1.21 |
| 17th layer | $SiO_2$ | 167.67 | 1.25 |
| 18th layer | $TiO_2$ | 96.82 | 1.15 |
| 19th layer | $SiO_2$ | 147.55 | 1.05 |
| 20th layer | $TiO_2$ | 84.19 | 1.00 |
| 21st layer | $SiO_2$ | 160.97 | 1.20 |
| 22nd layer | $TiO_2$ | 84.19 | 1.00 |
| 23rd layer | $SiO_2$ | 154.26 | 1.15 |
| 24th layer | $TiO_2$ | 95.13 | 1.13 |
| 25th layer | $SiO_2$ | 160.97 | 1.20 |
| 26th layer | $TiO_2$ | 99.34 | 1.18 |
| 27th layer | $SiO_2$ | 87.19 | 0.65 |
| Air | | | |

Figure 13:
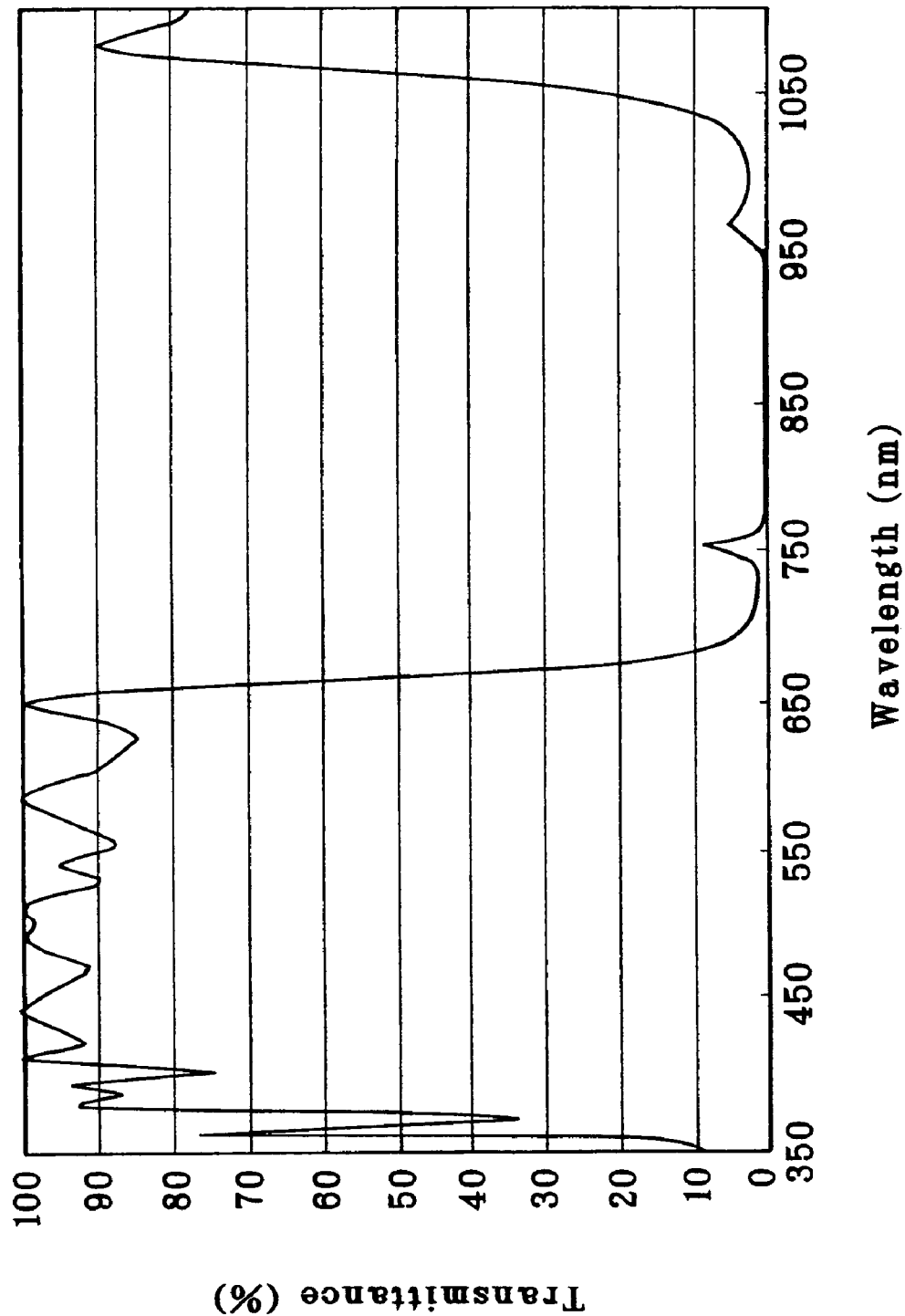
FIG. 13 is illustrative of the transmittance characteristics of one example of a near-infrared sharp cut coat.

The aforesaid near-infrared sharp cut coat has such transmittance characteristics as shown in FIG. 13.

Figure 14:
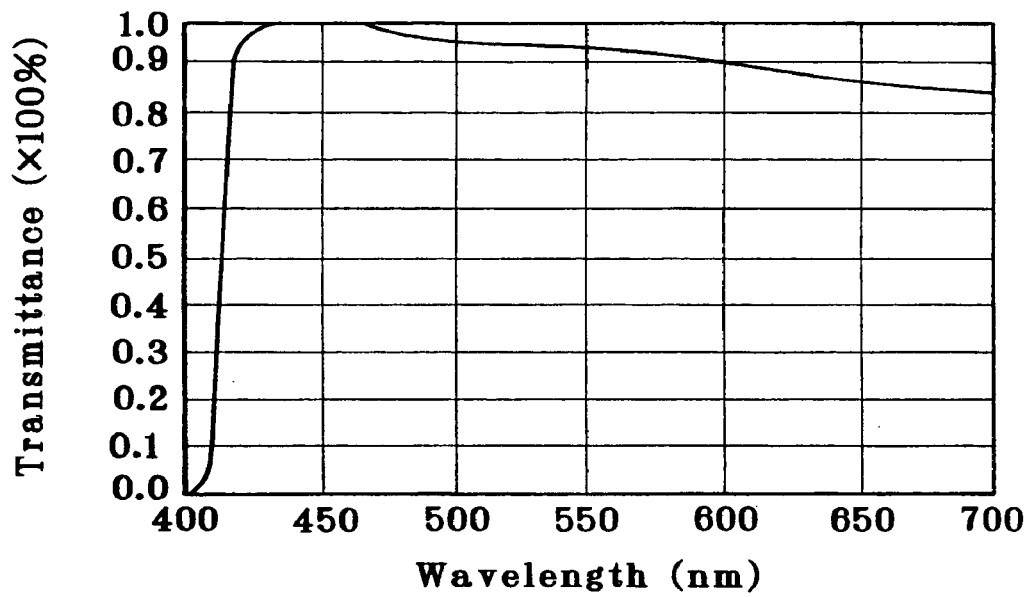
FIG. 14 is illustrative of the transmittance characteristics of one example of a color filter located on the exit surface side of a low-pass filter.

A low-pass filter is provided on its exit surface side with a color filter or coating for reducing the transmission of colors at such a short wavelength range as shown in FIG. 14, thereby making the color reproducibility of an electronic image much higher.

Preferably, that filter or coating should be designed such that the ratio of the transmittance of 420 nm wavelength with respect to the highest transmittance of a wavelength that is found in the range of 400 nm to 700 nm is at least 15% and that the ratio of 400 nm wavelength with respect to the highest wavelength transmittance is up to 6%.

It is thus possible to reduce a discernible difference between the colors perceived by the human eyes and the colors of the image to be picked up and reproduced. In other words, it is possible to prevent degradation in images due to the fact that a color of short wavelength less likely to be perceived through the human sense of sight can be readily seen by the human eyes.

When the ratio of the 400 nm wavelength transmittance is greater than 6%, the short wavelength region less likely to be perceived by the human eyes would be reproduced with perceivable wavelengths. Conversely, when the ratio of the 420 nm wavelength transmittance is less than 15%, a wavelength range perceivable by the human eyes is less likely to be reproduced, putting colors in an ill-balanced state.

Such means for limiting wavelengths can be more effective for imaging systems using a complementary colors mosaic filter.

In each of the aforesaid examples, coating is applied in such a way that, as shown in FIG. 14, the transmittance for 400 nm wavelength is 0%, the transmittance for 420 nm is 90%, and the transmittance for 440 nm peaks or reaches 100%.

With the synergistic action of the aforesaid near-infrared sharp cut coat and that coating, the transmittance for 400 nm is set at 0%, the transmittance for 420 nm at 80%, the transmittance for 600 nm at 82%, and the transmittance for 700 nm at 2% with the transmittance for 450 nm wavelength peaking at 99%, thereby ensuring more faithful color reproduction.

The low-pass filter is made up of three different filter elements stacked one upon another in the optical axis direction, each filter element having crystal axes in directions where, upon projected onto the image plane, the azimuth angle is horizontal (=0°) and ±45° therefrom. Three such filter elements are mutually displaced by a μm in the horizontal direction and by SQRT(½)×a in the ±45° direction for the purpose of moiré control, wherein SQRT means a square root.

Figure 15:
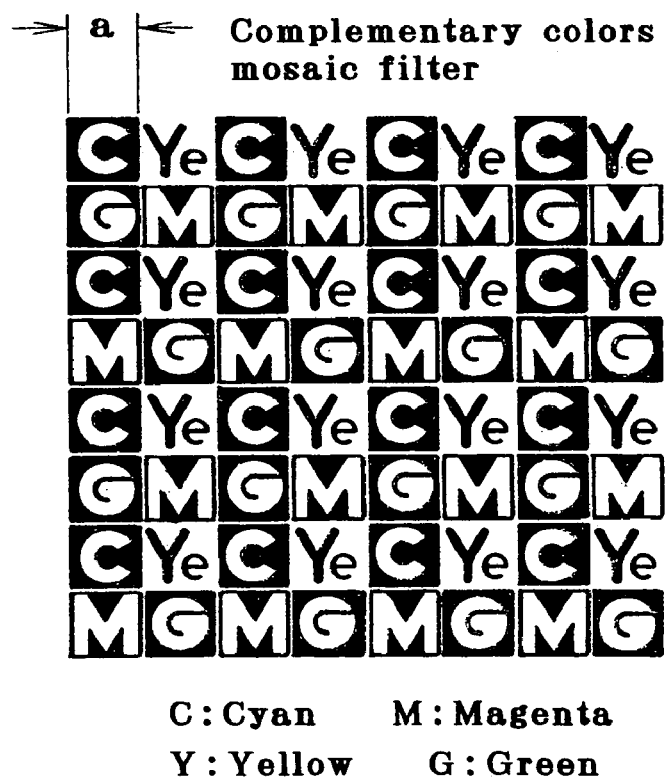
FIG. 15 is illustrative of how color filter elements are arranged for a complementary colors mosaic filter.

The image pickup plane I of a CCD is provided thereon with a complementary colors mosaic filter wherein, as shown in FIG. 15, color filter elements of four colors, cyan, magenta, yellow and green are arranged in a mosaic fashion corresponding to image pickup pixels. More specifically, these four different color filter elements, used in almost equal numbers, are arranged in such a mosaic fashion that neighboring pixels do not correspond to the same type of color filter elements, thereby ensuring more faithful color reproduction.

To be more specific, the complementary colors mosaic filter is composed of at least four different color filter elements as shown in FIG. 15, which should preferably have such characteristics as given below.

Each green color filter element G has a spectral strength peak at a wavelength $G_p$, each yellow filter element $Y_e$ has a spectral strength peak at a wavelength $Y_p$, each cyan filter element C has a spectral strength peak at a wavelength $C_p$, and each magenta filter element M has spectral strength peaks at wavelengths $M_{P1}$ and $M_{P2}$, and these wavelengths satisfy the following conditions.

510 nm < $G_p$ < 540 nm
5 nm < $Y_p - G_p$ < 35 nm
−100 nm < $C_p - G_p$ < −5 nm
430 nm < $M_{P1}$ < 480 nm
580 nm < $M_{P2}$ < 640 nm

To ensure higher color reproducibility, it is preferred that the green, yellow and cyan filter elements have a strength of at least 80% at 530 nm wavelength with respect to their respective spectral strength peaks, and the magenta filter elements have a strength of 10% to 50% at 530 nm wavelength with their spectral strength peak.

Figure 16:
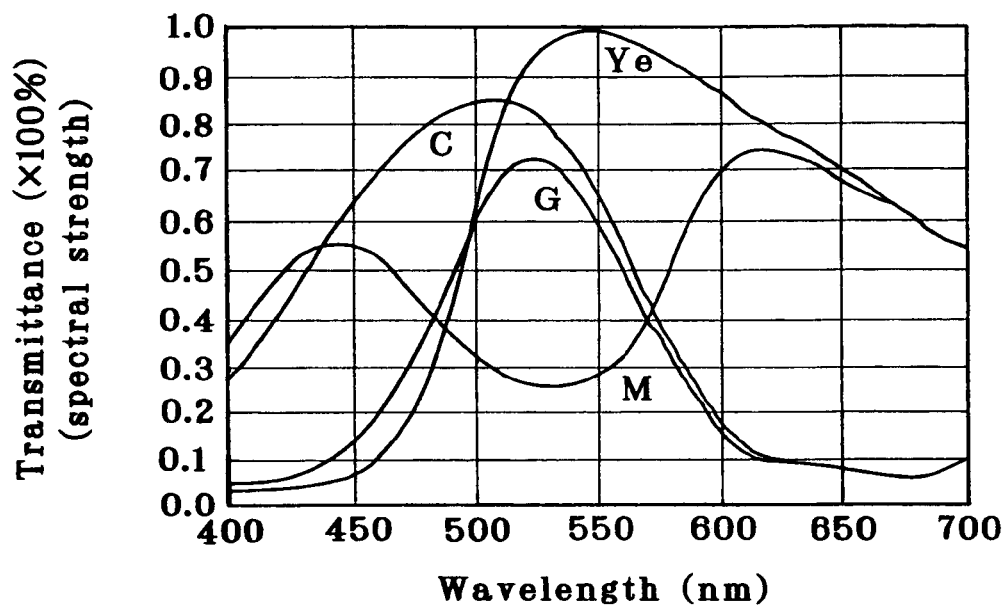
FIG. 16 is illustrative of one example of the wavelength characteristics of the complementary colors mosaic filter.

One example of the wavelength characteristics in the aforesaid respective examples is shown in FIG. 16. The green filter element G has a spectral strength peak at 525 nm. The yellow filter element $Y_e$ has a spectral strength peak at 555 nm. The cyan filter element C has a spectral strength peak at 510 nm. The magenta filter element M has peaks at 445 nm and 620 nm. At 530 nm, the respective color filter elements have, with respect to their respective spectral strength peaks, strengths of 99% for G, 95% for $Y_e$, 97% for C and 38% for M.

For such a complementary colors filter, such signal processing as mentioned below is electrically carried out by means of a controller (not shown) (or a controller used with digital cameras).

For luminance signals, $$Y = |G + M + Y_e + C| \times \frac{1}{4}$$

For chromatic signals, $$R-Y=|(M+Y_e)-(G+C)|$$

$$B-Y=|(M+C)-(G+Y_e)|$$

Through this signal processing, the signals from the complementary colors filter are converted into R (red), G (green) and B (blue) signals.

Now for, it is noted that the aforesaid near-infrared sharp cut coat may be located anywhere on the optical path, and that the number of low-pass filters may be either two as mentioned above or one.

Figure 17:
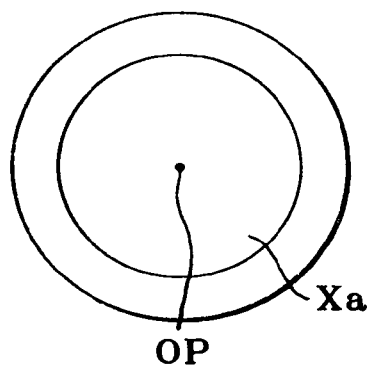
FIG. 17 is illustrative of an aperture configuration in a full aperture state.
Figure 18:
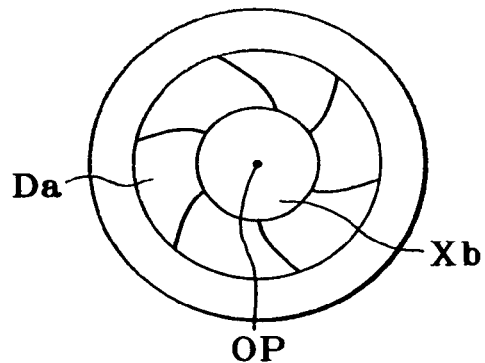
FIG. 18 is illustrative of a two-stage aperture configuration.

The aperture stop S is used for controlling the quantity of light in the imaging system of the invention. For this aperture stop, for instance, a variable stop may be used, which comprises a plurality of stop blades with a variable aperture for controlling the quantity of light. FIG. 17 is illustrative of one exemplary stop configuration upon full aperture, and FIG. 18 is illustrative of one exemplary configuration upon two-stage aperture. In FIGS. 17 and 18, OP stands for an optical axis, Da six stop blades, and Xa and Xb apertures. In the invention, only two aperture configurations, i.e., full-aperture configuration (FIG. 17) and a stop value (two-stage stop, FIG. 18) providing an F-number that satisfies given conditions may be used.

It is acceptable to use a turret provided with a plurality of aperture stops that are of fixed shape yet having different configurations or transmittances so that any of the aperture stops can be located on the optical axis on the object side of the image-formation optical system depending on the necessary brightness, thereby slimming down the stop mechanism. It is also acceptable to select from a plurality of aperture stops located on the turret one where the quantity of light is minimized, and fitting therein a light quantity decreasing filter that has a transmittance lower than those of other aperture stops. This prevents the aperture diameter of the stops from becoming too small, helping reduce degradation, if any, of image-formation performance due to diffraction occurring with a small aperture diameter of the stops.

Figure 19:
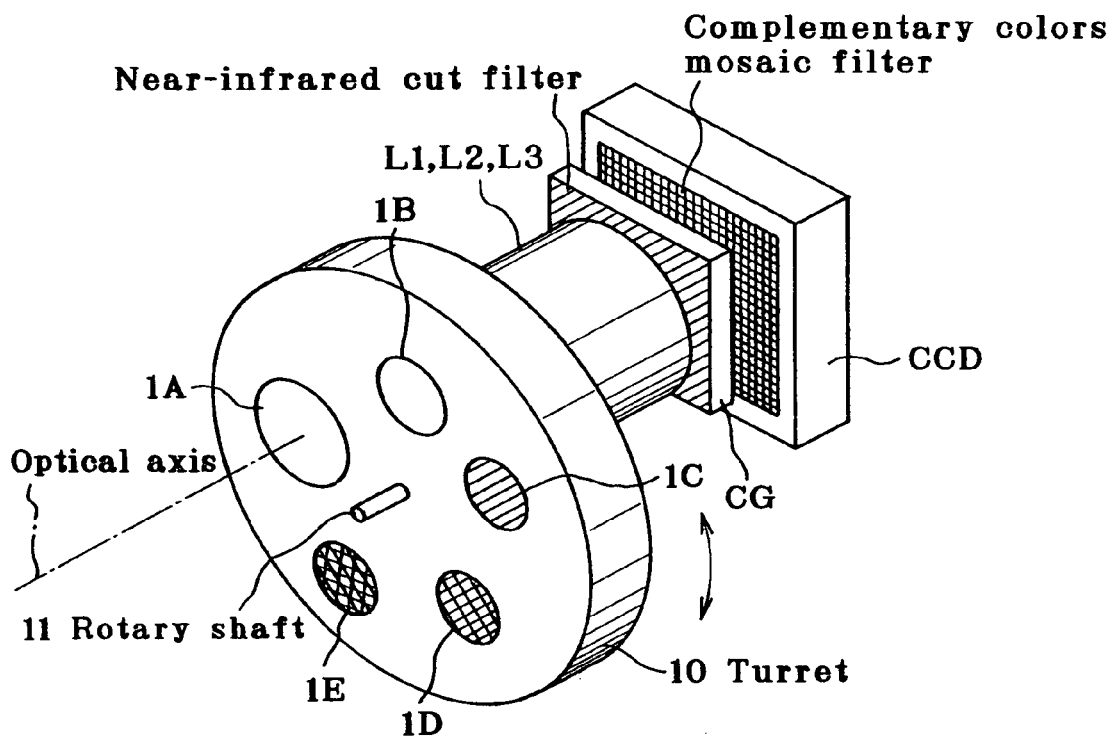
FIG. 19 is illustrative in perspective of the image-formation optical system of the invention wherein a turret is provided with a plurality of aperture stops of fixed shape, which have different configurations and transmittances.

FIG. 19 is a perspective view illustrative of one exemplary construction of this case. At an aperture stop S position on the optical axis on the object side of the first positive lens L1 in the image-formation optical system, there is located a turret 10 capable of brightness control at 0 stage, −1 stage, −2 stage, −3 stage and −4 stage.

The turret 10 is composed of an aperture 1A for 0 stage control, which is defined by a maximum stop diameter, circular fixed space (with a transmittance of 100% with respect to 550 nm wavelength), an aperture 1B for −1 stage correction, which is defined by a transparent plane-parallel plate having a fixed aperture shape with an aperture area nearly half that of the aperture 1A (with a transmittance of 99% with respect to 550 nm wavelength), and circular apertures 1C, 1D and 1E for −2, −3 and −4 stage corrections, which have the same aperture area as that of the aperture 1B and are provided with ND filters having the respective transmittances of 50%, 25% and 13% with respect to 550 nm wavelength.

By turning the turret 10 around a rotating shaft 11, any one of the apertures is located at the stop position, thereby controlling the quantity of light.

Figure 20:
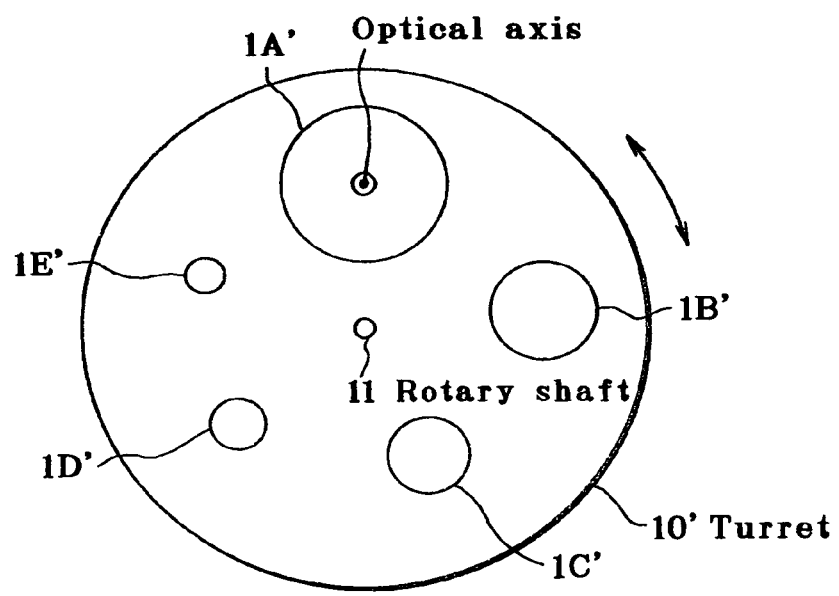
FIG. 20 is a front view of another turret that may be used in place of that of FIG. 19.

Instead of the turret 10 shown in FIG. 19, it is acceptable to use a turret 10' shown in the front view of FIG. 20. This turret 10' capable of brightness control at 0 stage, −1 stage, −2 stage, −3 stage and −4 stage is located at the stop S position on the optical axis on the object side of the first positive lens L1 in the image-formation optical system.

The turret 10' is composed of an aperture 1A' for 0 stage control, which is defined by a maximum stop diameter, circular fixed space, an aperture 1B' for −1 stage correction, which is of a fixed aperture shape with an aperture area nearly half that of the aperture 1A', and apertures 1C', 1D' and 1E' for −2, −3 and −4 stage corrections, which are of fixed shape with decreasing areas in this order.

By turning the turret 10' around a rotating shaft 11, any one of the apertures is located at the stop position thereby controlling the quantity of light.

Figure 21:
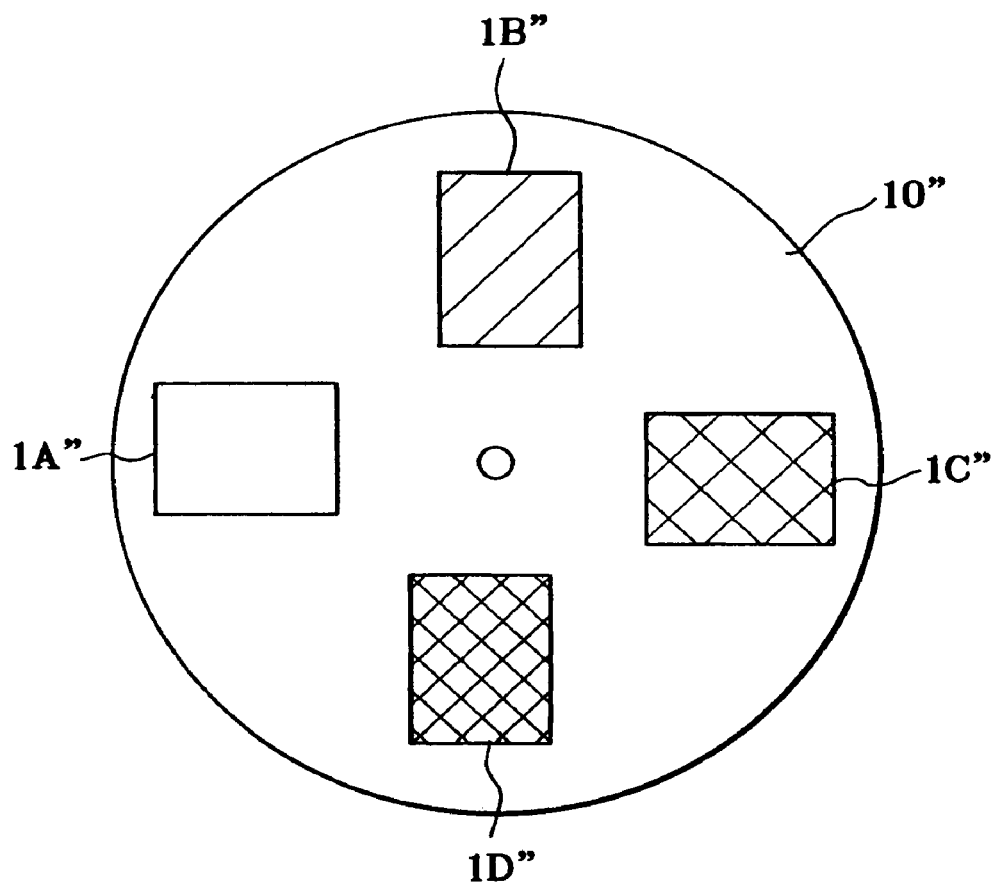
FIG. 21 is illustrative of another turret form of light quantity control filter available herein.

To achieve further thickness reductions, the aperture in the aperture stop S may be fixed in terms of shape and position, so that the quantity of light may be electrically controlled in response to signals from the image pickup device. Alternatively, the quantity of light may be controlled by insertion or de-insertion of an ND filter in or from other space in the lens system, for instance, in or from between the third negative lens L3 and the CCD cover glass CG. One example of this is shown in FIG. 21. As shown, it is acceptable to use a turret-form filter that comprises a turret 10" having a plain or hollow aperture 1A", an aperture 1B" defined by an ND filter having a transmittance of ½, an aperture 1C" defined by an ND filter having a transmittance of ¼, an aperture 1D" defined by an ND filter having a transmittance of ⅛, etc. For light quantity control, any of the apertures is located anywhere in the optical path by turning the turret around a center rotary shaft.

Figure 22:
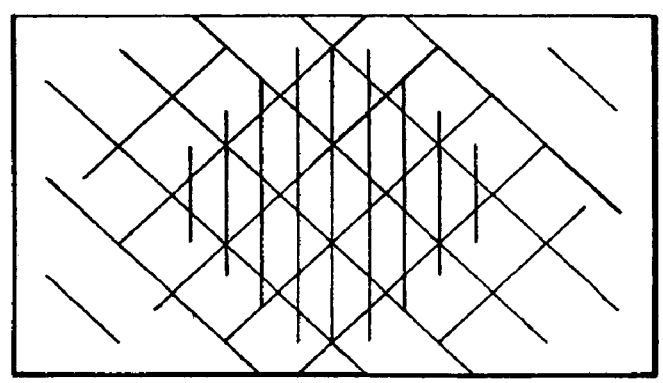
FIG. 22 is illustrative of one example of a filter that reduces variations of light quantity.

For the light quantity control filter, it is also acceptable to use a filter surface capable of performing light quantity control in such a way as to reduce light quantity variations, for instance, a filter in which, as shown in FIG. 22, the quantity of light decreases concentrically toward its center in such a way that for a dark subject, uniform transmittance is achieved while the quantity of light at its center is preferentially ensured, and for a bright subject alone, brightness variations are made up for.

Still alternatively, the aperture stop S may be defined by blackening a part of the peripheral portion of the first positive lens L1 on its entrance surface side.

When the imaging system of the invention is implemented in the form of, for instance, a camera wherein images are stored as still-frame ones, it is preferable to locate the light quantity control shutter in an optical path.

For that shutter, for instance, use may be made of a focal plane shutter, rotary shutter or liquid crystal shutter that is located just before the CCD. Alternatively, the aperture shutter itself may be constructed in a shutter form.

Figure 23A:
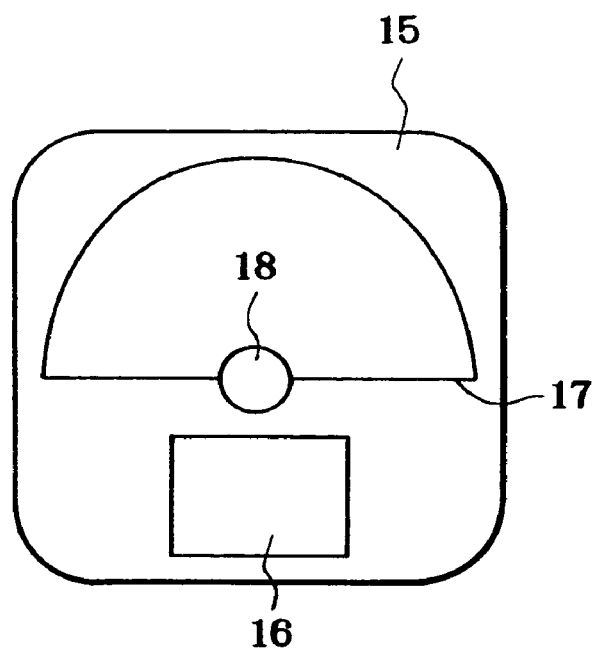
FIG. 23 is a rear and a front view of one example of a rotary focal plane shutter.
Figure 23B:
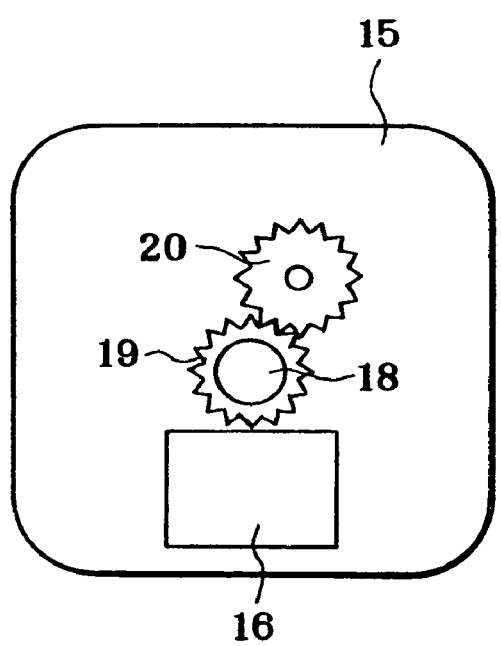
Figure 24A:
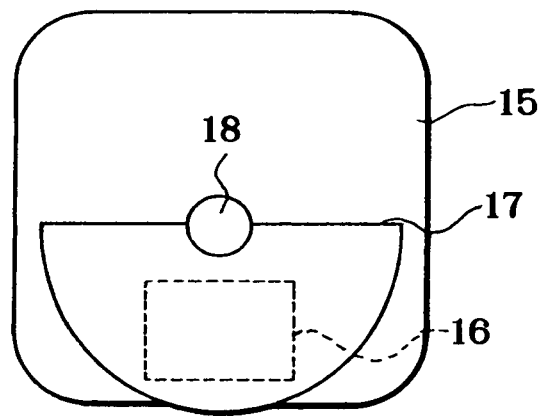
FIGS. 24(a), 24(b), 24(c) and 24(d) are illustrative of how the rotary shutter curtain of the shutter of FIG. 23 is rotated.
Figure 24B:
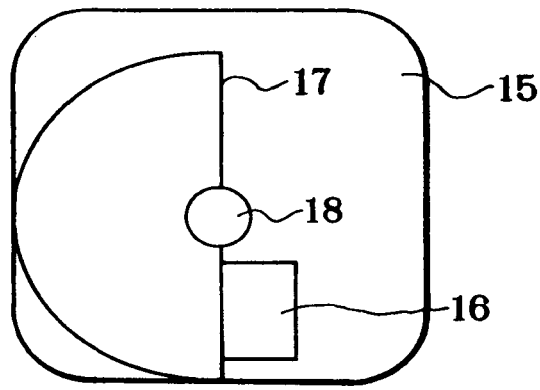
Figure 24C:
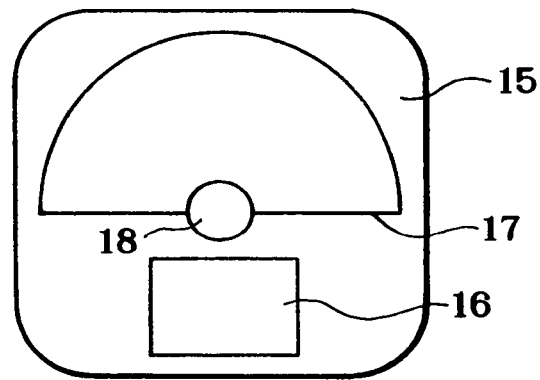
Figure 24D:
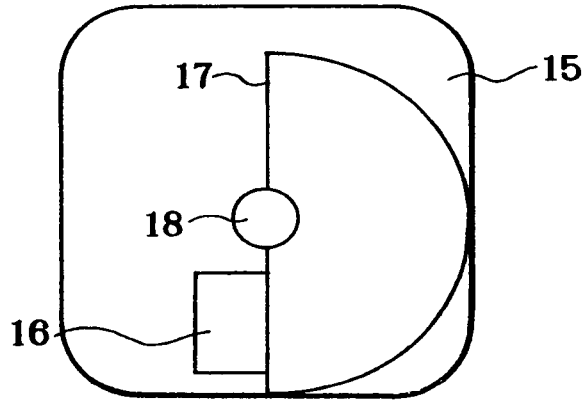

FIG. 23 is illustrative of one example of the shutter used herein. FIGS. 23(a) and 23(b) are a rear and a front view of a rotary focal plane shutter that is a sort of the focal plane shutter. Reference numeral 15 is a shutter substrate that is to be located just before the image plane or at any desired position in the optical path. The substrate 15 is provided with an aperture 16 through which an effective light beam through an optical system is transmitted. Numeral 17 is a rotary shutter curtain, and 18 a rotary shaft of the rotary shutter curtain 17. The rotary shaft 18 rotates with respect to the substrate 15, and is integral with the rotary shutter curtain 17. The rotary shaft 18 is engaged with gears 19 and 20 on the surface of the substrate 15. The gears 19 and 20 are connected to a motor not shown.

As the motor not shown is driven, the rotary shutter curtain 17 is rotated around the rotary shaft 18 via the gears 19 and 20.

Having a substantially semi-circular shape, the rotary shutter curtain 17 is rotated to open or close the aperture 16 in the substrate 15 to perform a shutter role. The shutter speed is then controlled by varying the speed of rotation of the rotary shutter curtain 17.

FIGS. 24(a) to 24(d) are illustrative of how the rotary shutter curtain 17 is rotated as viewed from the image plane side. The rotary shutter curtain 17 is displaced in time order of (a), (b), (c), (d) and (a).

By locating the aperture stops of fixed shape and the light quantity control filter or shutter at different positions in the lens system, it is thus possible to obtain an imaging system in which, while high image quality is maintained with the influence of diffraction minimized, the quantity of light is controlled by the filter or shutter, and the length of the lens system can be cut down as well.

Figure 25:
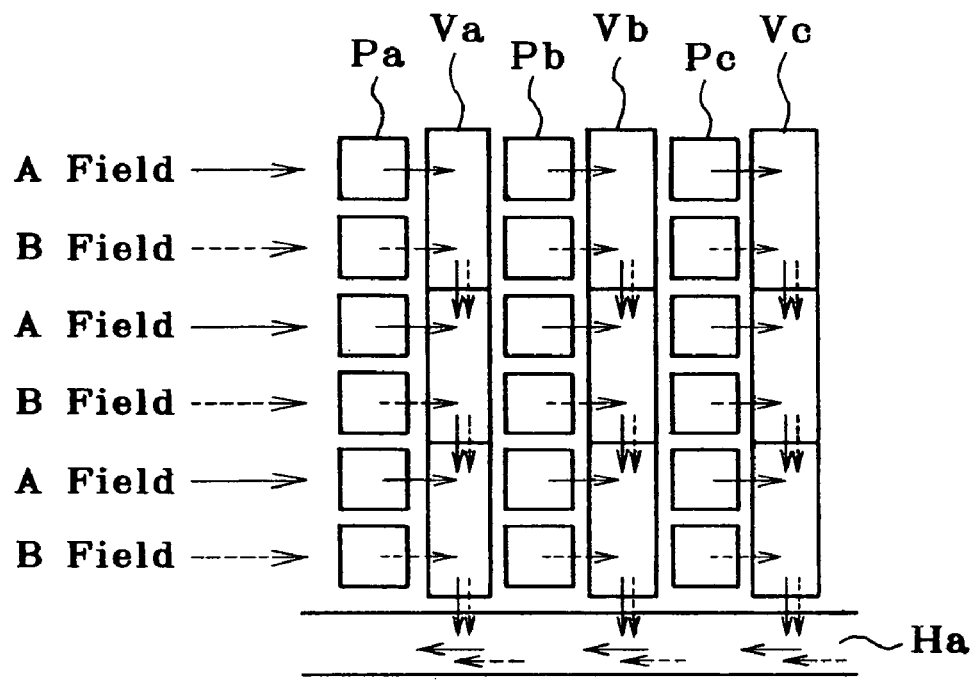
FIG. 25 is illustrative of the image pickup operation of CCD in interlaced mode.

In the invention, electrical control may be performed in such a way as to obtain still-frame images by extracting a part of electrical signals of the CCD without recourse to any mechanical shutter. CCD image pickup operation is now explained with reference to FIGS. 25 and 26. FIG. 25 is illustrative of CCD image pickup operation wherein signals are sequentially read in the interlaced scanning mode. In FIG. 25, Pa, Pb and Pc are photosensitive blocks using photodiodes, Va, Vb and Vc are CCD vertical transfer blocks, and Ha is a CCD horizontal transfer block. The A field is an odd-number field and the B field is an even-number field.

In the arrangement of FIG. 25, the basic operation takes place in the following order: (1) accumulation of signal charges by light at the photosensitive block (photoelectric conversion), (2) shift of signal charges from the photosensitive block to the vertical transfer block (field shift), (3) transfer of signal charges at the vertical transfer block (vertical transfer), (4) transfer of signal charges from the vertical transfer block to the horizontal transfer block (line shift), (5) transfer of signal charges at the horizontal transfer block (horizontal transfer), and (6) detection of signal charges at the output end of the horizontal transfer block (detection). Such sequential reading may be carried out using either one of the A field (odd-number field) and the B field (even-number field).

When the interlaced scanning CCD image pickup mode of FIG. 25 is applied to TV broadcasting or analog video formats, the timing of accumulation at the A field and the B field lags by $1/60$. When, with this timing lag uncorrected, a frame image is constructed as a DSC (digital spectrum compatible) image, there is blurring such as a double image in the case of a subject in motion. In this CCD image pickup mode, the A field and B field are simultaneously exposed to light to mix signals at adjacent fields. After processed by a mechanical shutter upon the completion of exposure, signals are independently read from the A field and the B field for signal synthesis.

In the invention, while the role of the mechanical shutter is limited to only prevention of smearing, signals are sequentially read out of the A field alone or signals are simultaneously read out of both the A field and the B field in a mixed fashion, so that a high-speed shutter can be released irregardless of the driving speed of the mechanical shutter (because of being controlled by an electronic shutter alone), although there is a drop of vertical resolution. The arrangement of FIG. 25 has the merit of making size reductions easy, because the number of CCDs in the vertical transfer block is half the number of photodiodes forming the photosensitive block.

Figure 26:
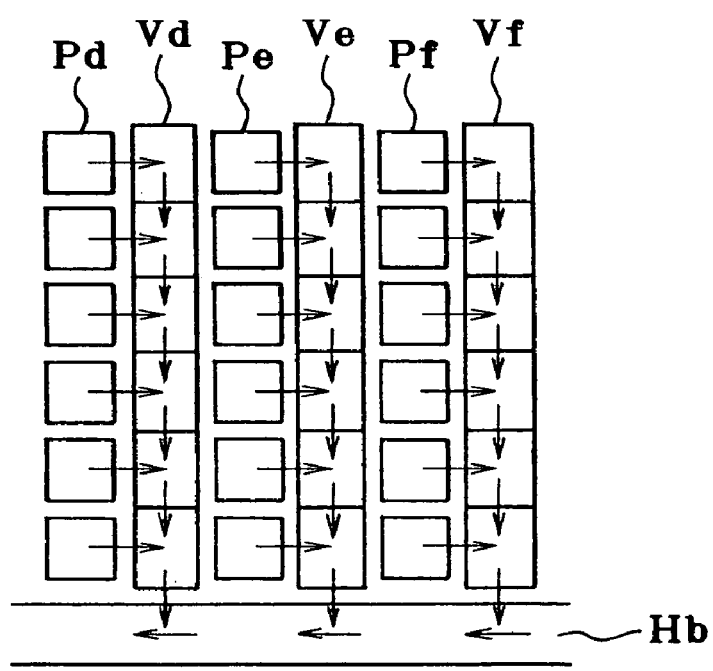
FIG. 26 is illustrative of the image pickup operation of CCD in progressive mode.

FIG. 26 is illustrative of CCD image pickup operation wherein the sequential reading of signals is performed in the progressive mode. In FIG. 26, Pd to Pf are photosensitive blocks using photodiodes, Vd, Ve and Vf are CCD vertical transfer blocks and Hb is a CCD horizontal transfer block.

In FIG. 26, signals are read in order of the arranged pixels, so that charge accumulation reading operation can be all electronically controlled. Accordingly, exposure time can be cut down to about ($1/10,000$) second). The arrangement of FIG. 26 has the demerit of making it more difficult to achieve size reductions because of an increased number of vertical CCDs as compared with the arrangement of FIG. 25. However, the invention is applicable to the mode of FIG. 25 as well as to the mode of FIG. 26 because of such merits as mentioned above.

The present imaging system constructed as described above may be applied to phototaking systems where object images formed through image-formation optical systems are received at image pickup devices such as CCDs, inter alia, digital cameras or video cameras as well as PCs and telephone sets that are typical information processors, in particular, easy-to-carry cellular phones. Given below are some such embodiments.

Figure 27:
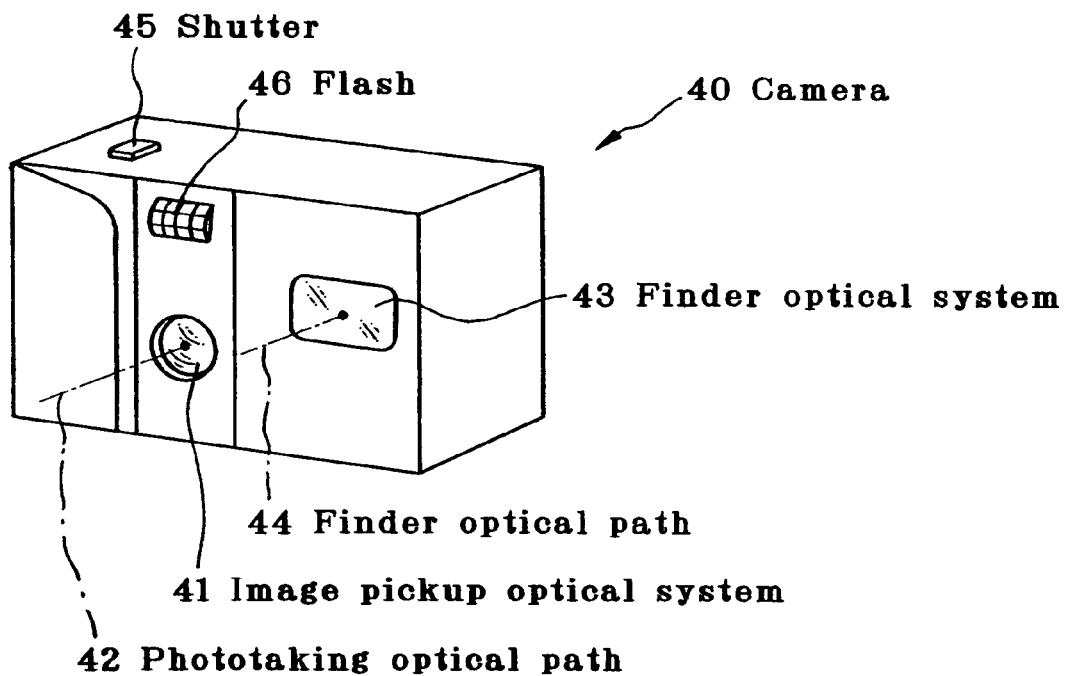
FIG. 27 is a front perspective view illustrative of the outward appearance of a digital camera incorporating the image-formation optical system of the invention.
Figure 28:
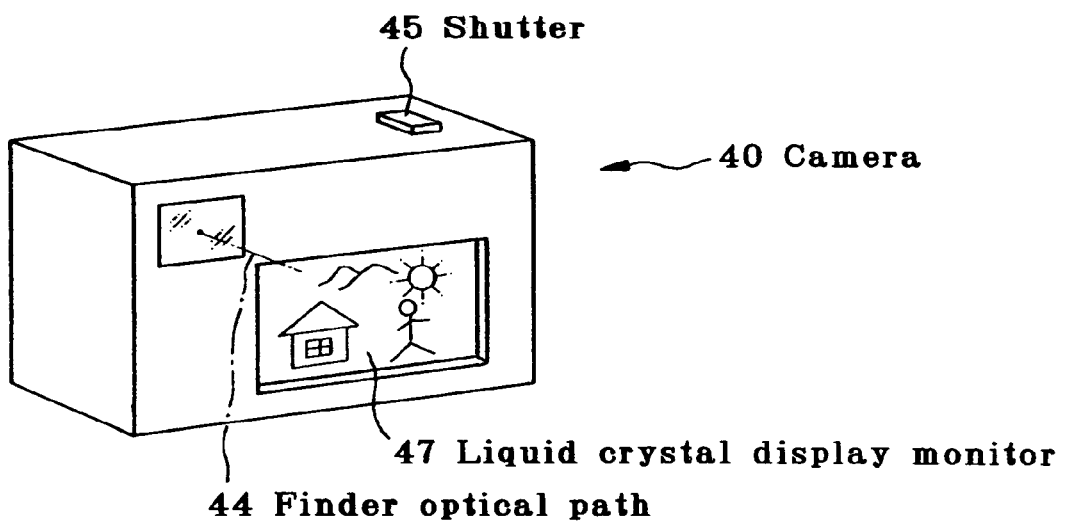
FIG. 28 is a rear perspective view of the digital camera of FIG. 27.
Figure 29:
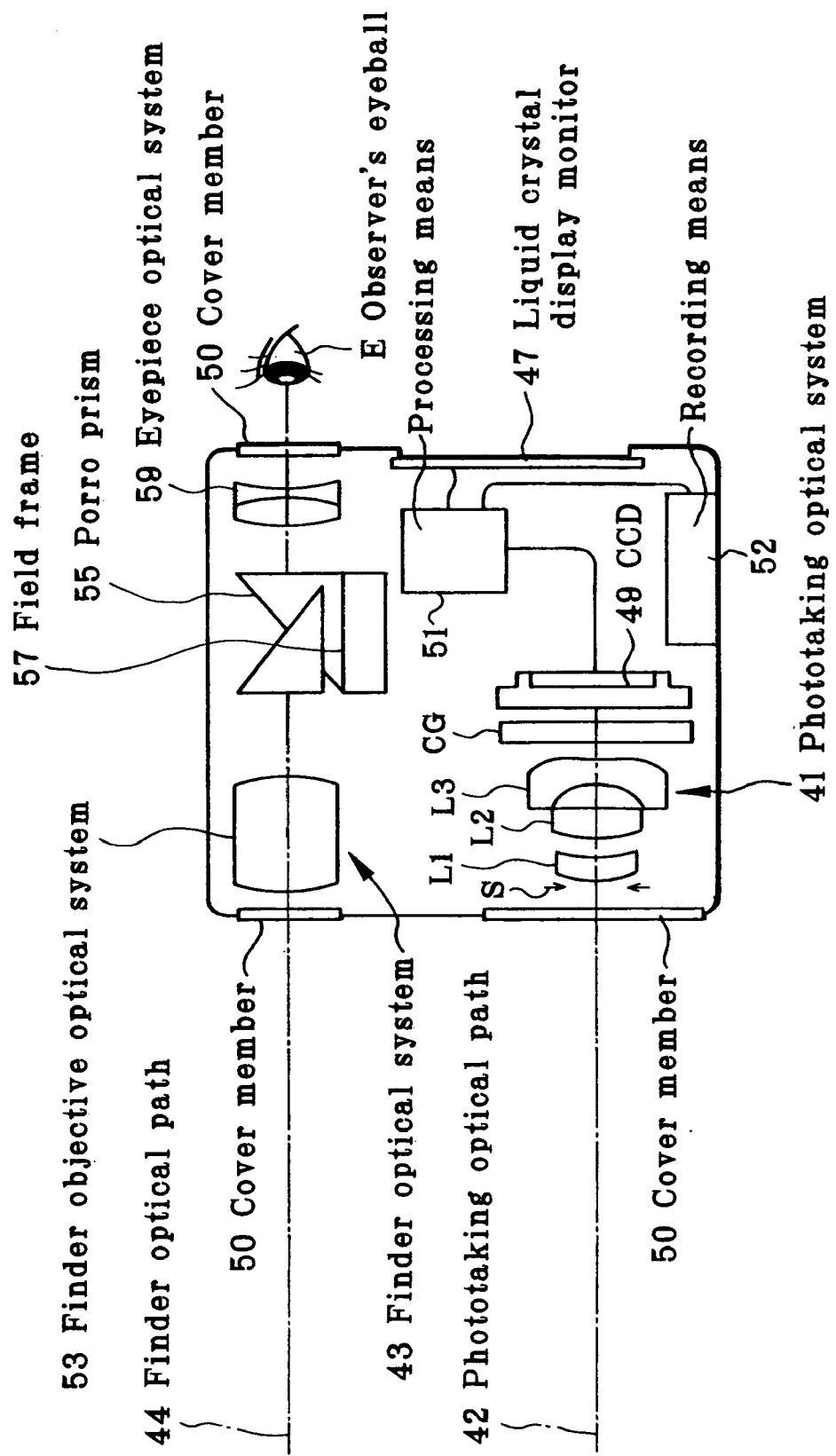
FIG. 29 is a sectional schematic of the digital camera of FIG. 27.

FIGS. 27, 28 and 29 are conceptual illustrations of a phototaking optical system 41 for digital cameras, in which the image-formation optical system of the invention is incorporated. FIG. 27 is a front perspective view of the outward appearance of a digital camera 40, and FIG. 28 is a rear perspective view of the same. FIG. 29 is a sectional view of the construction of the digital camera 40. In this embodiment, the digital camera 40 comprises a phototaking optical system 41 including a phototaking optical path 42, a finder optical system 43 including a finder optical path 44, a shutter 45, a flash 46, a liquid crystal monitor 47 and so on. As the shutter 45 mounted on the upper portion of the camera 40 is pressed down, phototaking takes place through the phototaking optical system 41, for instance, the image-formation optical system according to Example 1. An object image formed by the phototaking optical system 41 is formed on the image pickup plane of a CCD 49 via a cover glass CG provided with a near-infrared cut coat and having a low-pass filter function. An object image received at CCD 49 is shown as an electronic image on the liquid crystal monitor 47 via processing means 51, which monitor is mounted on the back of the camera. This processing means 51 is connected with recording means 52 in which the phototaken electronic image may be recorded. It is here noted that the recording means 52 may be provided separately from the processing means 51 or, alternatively, it may be constructed in such a way that images are electronically recorded and written therein by means of floppy discs, memory cards, MOs or the like. This camera may also be constructed in the form of a silver-halide camera using a silver-halide film in place of CCD 49.

Moreover, a finder objective optical system 53 is located on the finder optical path 44. An object image formed by the finder objective optical system 53 is in turn formed on the field frame 57 of a Porro prism 55 that is an image-erecting member. In the rear of the Porro prism 55 there is located an eyepiece optical system 59 for guiding an erected image into the eyeball E of an observer. It is here noted that cover members 50 are provided on the entrance sides of the phototaking optical system 41 and finder objective optical system 53 as well as on the exit side of the eyepiece optical system 59.

With the thus constructed digital camera 40, it is possible to achieve high performance and compactness, because the phototaking optical system 41 is of high performance and compactness.

In the embodiment of FIG. 29, plane-parallel plates are used as the cover members 50; however, it is acceptable to use powered lenses.

Figure 30:
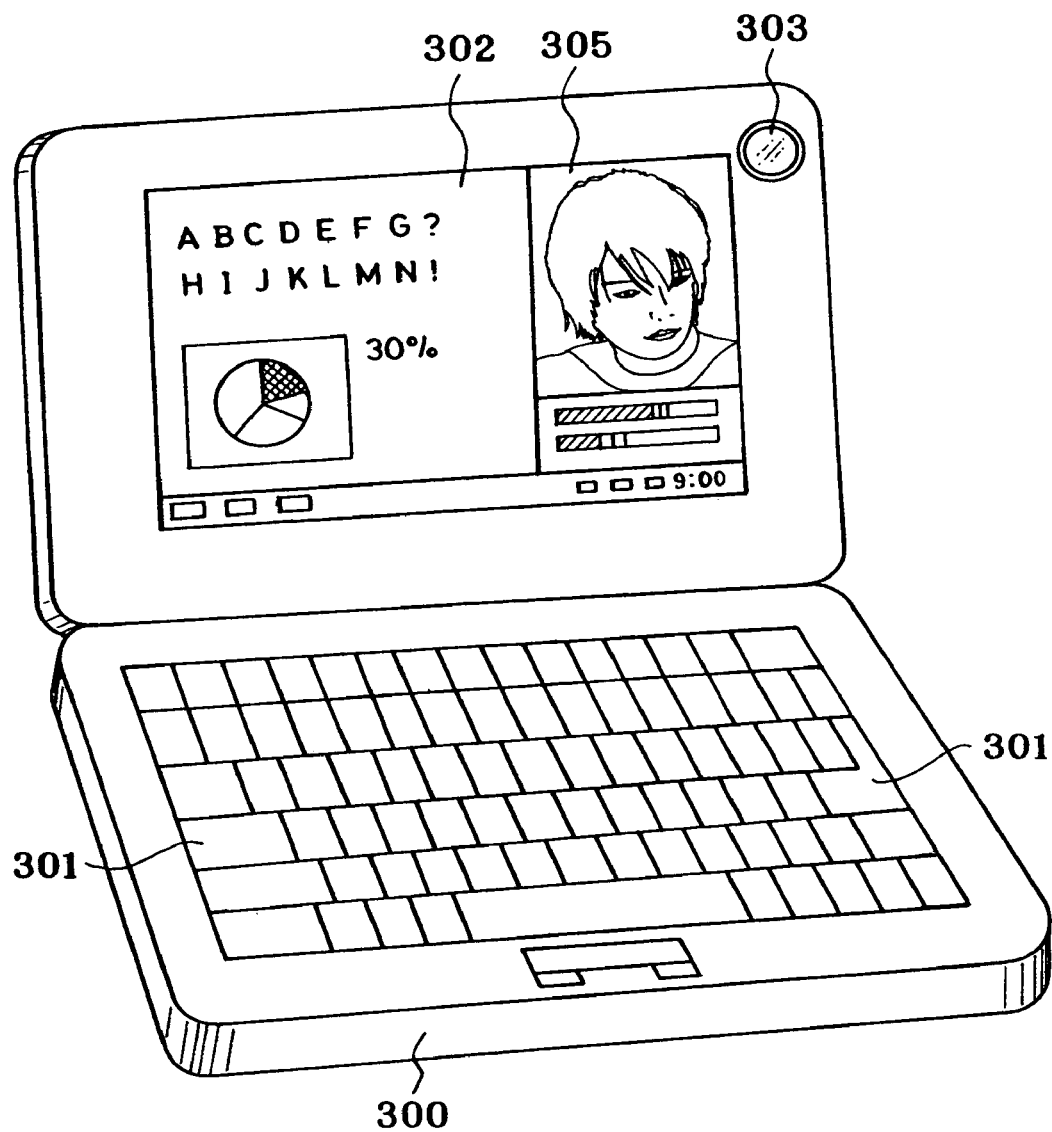
FIG. 30 is a front perspective view of a personal computer in use, in which the image-formation optical system of the invention is incorporated as an objective optical system.
Figure 31:
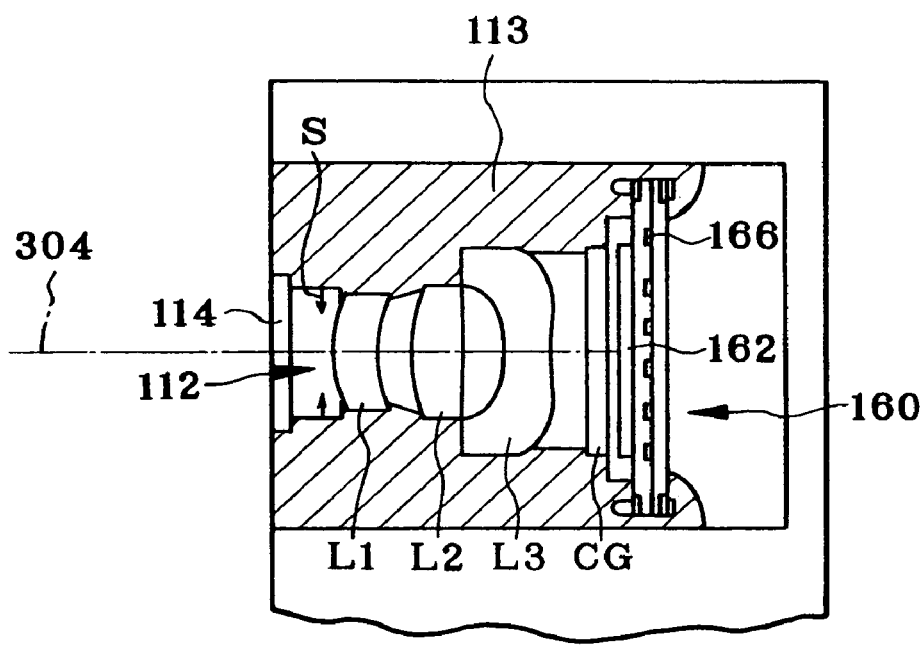
FIG. 31 is a sectional view of a phototaking optical system in the personal computer.
Figure 32:
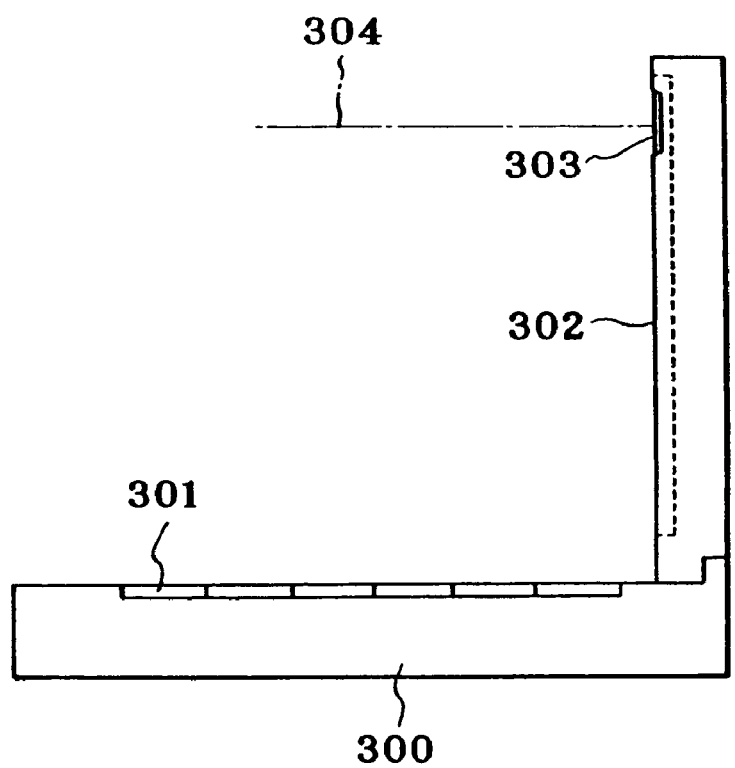
FIG. 32 is a side view of the state of FIG. 30.

FIGS. 30, 31 and 32 are illustrative of a personal computer that is one example of the information processor in which the image-formation optical system of the invention is built as an objective optical system. FIG. 30 is a front perspective view of a personal computer 300 in use, FIG. 31 is a sectional view of a phototaking optical system 303 in the personal computer 300, and FIG. 32 is a side view of the state of FIG. 30. As shown in FIGS. 30, 31 and 32, the personal computer 300 comprises a keyboard 301 via which an operator enters information therein from outside, information processing or recording means (not shown), a monitor 302 on which the information is shown for the operator, and a phototaking optical system 303 for taking an image of the operator and surrounding images. For the monitor 302, use may be made of a transmission type liquid crystal display device illuminated by backlight (not shown) from the back surface, a reflection type liquid crystal display device in which light from the front is reflected to show images, or a CRT display device. While the phototaking optical system 303 is shown as being built in the upper right portion of the monitor 302, it may be located somewhere around the monitor 302 or keyboard 301.

This phototaking optical system 303 comprises, on a phototaking optical path 304, an objective lens 112 comprising the image-formation optical system of the invention (roughly shown) and an image pickup device chip 162 for receiving an image. These are built in the personal computer 300.

Here a cover CG having a low-pass filter function is additionally applied onto the image pickup device chip 162 to form an integral imaging unit 160, which can be fitted into the rear end of the lens barrel 113 of the objective lens 112 in one-touch operation. Thus, the assembly of the objective lens 112 and image pickup device chip 162 is facilitated because of no need of alignment or control of surface-to-surface spacing. The lens barrel 113 is provided at its end (not shown) with a cover glass 114 for protection of the objective lens 112.

An object image received at the image pickup device chip 162 is entered via a terminal 166 in the processing means of the personal computer 300, and shown as an electronic image on the monitor 302. As an example, an image 305 taken of the operator is shown in FIG. 30. This image 305 may be shown on a personal computer on the other end via suitable processing means and the Internet or telephone line.

Figure 33A:
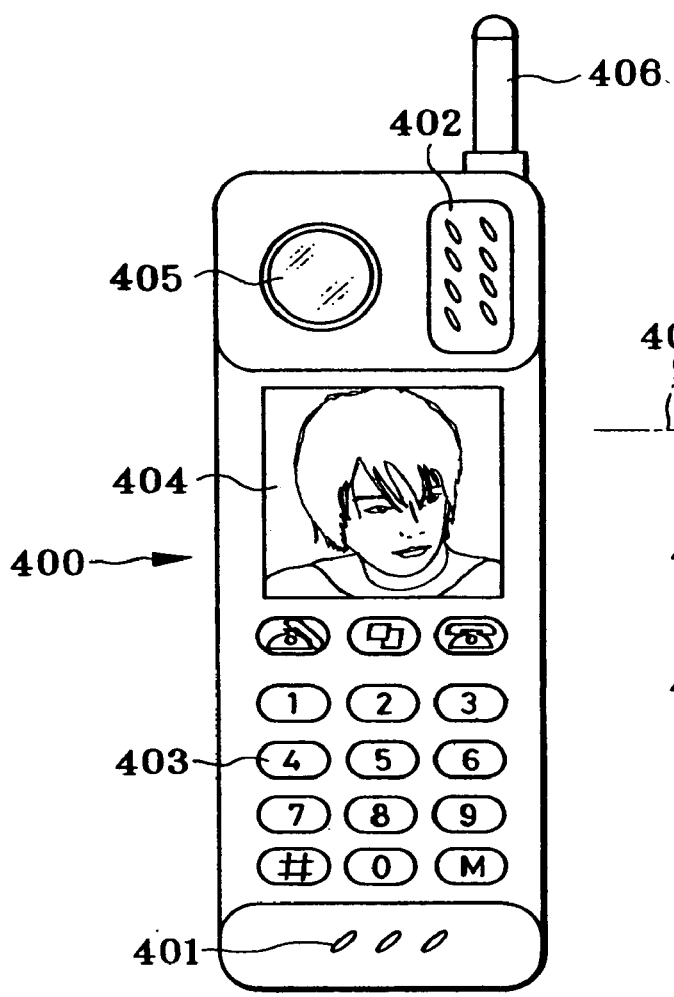
FIGS. 33(a) and 33(b) are a front and a side view of a cellular phone incorporating the image-formation optical system of the invention as an objective optical system.
Figure 33B:
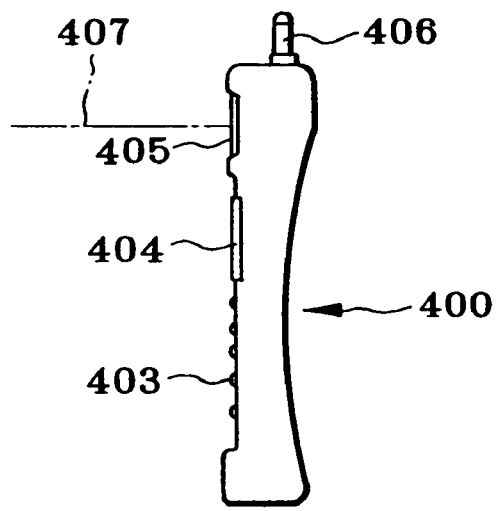
Figure 33C:
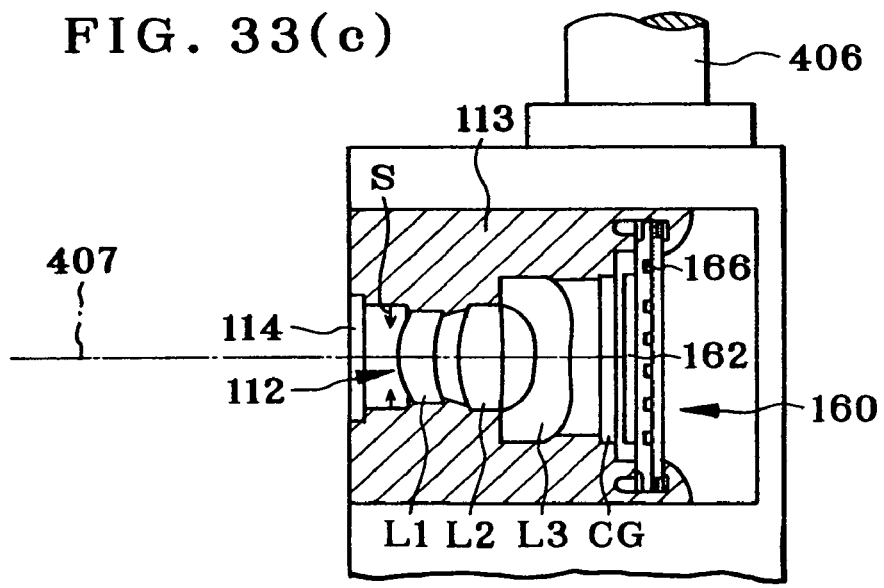
FIG. 33(c) is a sectional view of a phototaking optical system for the same.

FIGS. 33(a), 33(b) and 33(c) are illustrative of a telephone set that is one example of the information processor in which the image-formation optical system of the invention is built in the form of a phototaking optical system, especially a convenient-to-carry cellular phone. FIG. 33(a) and FIG. 33(b) are a front and a side view of a cellular phone 400, respectively, and FIG. 33(c) is a sectional view of a phototaking optical system 405. As shown in FIGS. 33(a), 33(b) and 33(c), the cellular phone 400 comprises a microphone 401 for entering the voice of an operator therein as information, a speaker 402 for producing the voice of the person on the other end, an input dial 403 via which the operator enters information therein, a monitor 404 for displaying an image taken of the operator or the person on the other end and indicating information such as telephone numbers, a phototaking optical system 405, an antenna 406 for transmitting and receiving communication waves, and processing means (not shown) for processing image information, communication information, input signals, etc. Here the monitor 404 is a liquid crystal display device. It is noted that the components are not necessarily arranged as shown. The phototaking optical system 405 comprises, on a phototaking optical path 407, an objective lens 112 comprising the image-formation optical system of the invention (roughly shown) and an image pickup device chip 162 for receiving an object image. These are built in the cellular phone 400.

Here a cover glass CG having a low-pass filter function is additionally applied onto the image pickup device chip 162 to form an integral imaging unit 160, which can be fitted into the rear end of the lens barrel 113 of the objective lens 112 in one-touch operation. Thus, the assembly of the objective lens 112 and image pickup device chip 162 is facilitated because of no need of alignment or control of surface-to-surface spacing. The lens barrel 113 is provided at its end (not shown) with a cover glass 114 for protection of the objective lens 112.

An object image received at the image pickup device chip 162 is entered via a terminal 166 in processing means (not shown), so that the object image can be displayed as an electronic image on the monitor 404 and/or a monitor at the other end. The processing means also include a signal processing function for converting information about the object image received at the image pickup device chip 162 into transmittable signals, thereby sending the image to the person at the other end.

It is here understood that each of the embodiments mentioned above could be modified in various fashions without any departure from the scope of what is claimed.

As can be seen from the foregoing, the present invention can provide a high-performance yet small-format image-formation optical system, and a small-format yet high-performance imaging system incorporating the same.

I claim:

1. An image-formation optical system comprising, in order from an object side thereof, an aperture stop, a first positive meniscus lens convex on an object side thereof, a second positive lens having an aspheric surface and a third negative lens having an aspheric surface, wherein an image side surface of the third negative lens is the aspheric surface, the image side surface of the third negative lens is in contact with an air space, and a total of three lens elements are used.

2. The image-formation optical system according to claim 1, which satisfies the following condition:

$$0.95 < \Sigma d/f < 1.25 \quad (1)$$

where $\Sigma d$ is a distance on an optical axis of the image-formation optical system from an object side-surface of the first positive meniscus lens to an image plane side-surface of the third negative lens, and f is a focal length of the image-formation optical system.

3. The image-formation optical system according to claim 1, wherein said first positive meniscus lens satisfies the following condition:

$$0.3 < r_1/f < 0.6 \quad (2)$$

where $r_1$ is a radius of curvature on an optical axis of an object side-surface of the first positive meniscus lens, and f is a focal length of the image-formation optical system.

4. The image-formation optical system according to claim 1, which satisfies the following conditions:

$$0.5 < f_{12}/|f_3| < 1 \quad (3)$$

where $f_{12}$ is a composite focal length of the first positive meniscus lens and the second positive lens, $f_3$ is a focal length of the third negative lens, and f is a focal length of the image-formation optical system.

5. The image-formation optical system according to claim 1, which satisfies the following condition:

$$-1 < EXP/f < -0.5 \quad (5)$$

where EXP is a paraxial exit pupil position as determined on the basis of an image-formation position of the image-formation optical system relative to an object point at infinity, and f is a focal length of the image-formation optical system.

6. The image-formation optical system according to claim 1, wherein the second positive lens having an aspheric surface is made up of a plastic lens.

7. The image-formation optical system according to claim 1, wherein the third negative lens having an aspheric surface is made up of a plastic lens.

8. The image-formation optical system according to claim 1, which satisfies the following condition:

$$0.98 < \Sigma d/f < 1.20 \quad (1\text{-}1)$$

where $\Sigma d$ is a distance on an optical axis of the image-formation optical system from an object side-surface of the first positive meniscus lens to an image plane side-surface of the third negative lens, and f is a focal length of the image-formation optical system.

9. The image-formation optical system according to claim 1, which satisfies the following condition:

$$0.32 < r_1/f < 0.55 \quad (2\text{-}1)$$

where $r_1$ is a radius of curvature on an optical axis of an object side-surface of the first positive meniscus lens, and f is a focal length of the image-formation optical system.

10. The image-formation optical system according to claim 1, which satisfies the following condition:

$$0.53 < f_{12}/|f_3| < 0.96 \quad (3\text{-}1)$$

where $f_{12}$ is a composite focal length of the first positive meniscus lens and the second positive lens, and $f_3$ is a focal length of the third negative lens.

11. The image-formation optical system according to claim 1, which satisfies the following condition:

$$0.75 < |f_3|/f < 1.3 \quad (4\text{-}1)$$

where $f_3$ is a focal length of the third negative lens, and f is a focal length of the image-formation optical system.

12. The image-formation optical system according to claim 1, which satisfies the following condition:

$$-0.8 < EXP/f < -0.6 \quad (5\text{-}1)$$

where EXP is a paraxial exit pupil position as determined on the basis of an image-formation position of the image-formation optical system relative to an object point at infinity, and f is a focal length of the image-formation optical system.

13. The image-formation optical system according to claim 1, wherein lenses having a refracting power are provided only by said first positive meniscus lens, said second positive lens and said third negative lens.

14. An imaging system, comprising an image-formation optical system as recited in claim 1 and an electronic image pickup device located on an image side thereof.

15. The imaging system according to claim 14, which satisfies the following condition:

$$55° < 2\omega < 70° \quad (6)$$

where $\omega$ is a half angle of view, and $2\omega$ is a total angle of view.

16. The imaging system according to claim 14, which satisfies the following condition:

$$60° < 2\omega < 67° \quad (6\text{-}1)$$

where $\omega$ is a half angle of view and $2\omega$ is a total angle of view.

17. The image-formation optical system according to claim 1, wherein the third negative lens is a bi-concave lens.

18. The image-formation optical system according to claim 1, wherein the first positive meniscus lens, the second positive lens, and the third negative lens are single lenses respectively.

19. An imaging system comprising an image-formation optical system comprising, in order from an object side of said image-formation optical system, an aperture stop, a first positive meniscus lens convex on an object side thereof, a second positive lens having an aspheric surface and a third negative lens having an aspheric surface, and an image pickup device located on an image side thereof, wherein a total of three lens elements are used in said image-formation optical system, and said aperture stop has a fixed shape of aperture through which light rays pass, wherein an outer peripheral surface of said aperture is inclined in such a way as to taper down to an optical axis toward an image plane side.

20. An imaging system comprising an image-formation optical system comprising, in order from an object side of said image-formation optical system, an aperture stop, a first positive meniscus lens convex on an object side thereof, a second positive lens having an aspheric surface and a third negative lens having an aspheric surface, and an image pickup device located on an image side thereof, wherein a total of three lens elements are used in said image-formation optical system, and there is provided a lens barrel for holding said image-formation optical system and said image pickup device, wherein said aperture stop is molded integrally of the same resin of which said lens barrel is molded.

21. An imaging system comprising an image-formation optical system comprising, in order from an object side of said image-formation optical system, an aperture stop, a first positive meniscus lens convex on an object side thereof, a second positive lens having an aspheric surface and a third negative lens having an aspheric surface, and an image pickup device located on an image side thereof, wherein a total of three lens elements are used in said image-formation optical system, a lens barrel is provided for holding said image-formation optical system, and a peripheral surface of at least said third negative lens is inclined in such a way as to taper down to an optical axis toward the object side for abutment on said lens barrel.

22. An imaging system comprising an image-formation optical system comprising, in order from an object side of said image-formation optical system, an aperture stop, a first positive meniscus lens convex on an object side thereof, a second positive lens having an aspheric surface and a third negative lens having an aspheric surface, and an image pickup device located on an image side thereof, wherein a total of three lens elements are used in said image-formation optical system, a lens barrel is provided for holding said image-formation optical system, said first positive meniscus lens takes on a circular shape as viewed from an entrance side of said imaging system, and said third negative lens is configured such that, as viewed from the entrance side of said imaging system, a length thereof in a direction corresponding to a short-side direction of an effective image pickup area of said image pickup device is shorter than a length thereof in a direction corresponding to a long-side direction of the effective image pickup device.

23. An image-formation optical system comprising, in order from an object side thereof, an aperture stop, a first positive meniscus lens convex on an object side thereof, a second positive lens having an aspheric surface and a third negative lens having an aspheric surface, wherein a total of three lens elements are used, the image-formation optical system satisfying the following condition:

$$0.95 < \Sigma d/f < 1.25 \quad (1)$$

where $\Sigma d$ is a distance on an optical axis of the image-formation optical system from an object side-surface of the first positive meniscus lens to an image plane side-surface of the third negative lens, and f is a focal length of the image-formation optical system.

24. An image-formation optical system comprising, in order from an object side thereof, an aperture stop, a first positive meniscus lens convex on an object side thereof, a second positive lens having an aspheric surface and a third negative lens having an aspheric surface, wherein a total of three lens elements are used, the first positive meniscus lens satisfying the following condition:

$$0.3 < r_1/f < 0.6 \qquad (2)$$

where $r_1$ is a radius of curvature on an optical axis of an object side-surface of the first positive meniscus lens, and f is a focal length of the image-formation optical system.

25. An image-formation optical system comprising, in order from an object side thereof, an aperture stop, a first positive meniscus lens convex on an object side thereof, a second positive lens having an aspheric surface and a third negative lens having an aspheric surface, wherein a total of three lens elements are used, the image-formation optical system satisfying the following conditions:

$$0.5 < |f_{12}/f_3| < 1 \qquad (3)$$

where $f_{12}$ is a composite focal length of the first positive meniscus lens and the second positive lens, $f_3$ is a focal length of the third negative lens, and f is a focal length of the image-formation optical system.

26. An image-formation optical system comprising, in order from an object side thereof, an aperture stop, a first positive meniscus lens convex on an object side thereof, a second positive lens having an aspheric surface and a third negative lens having an aspheric surface, wherein a total of three lens elements are used, the image-formation optical system satisfying the following condition:

$$-1 < EXP/f < -0.5 \qquad (5)$$

where EXP is a paraxial exit pupil position as determined on the basis of an image-formation position of the image-formation optical system relative to an object point at infinity, and f is a focal length of the image-formation optical system.

27. An image-formation optical system comprising, in order from an object side thereof, an aperture stop, a first positive meniscus lens convex on an object side thereof, a second positive lens having an aspheric surface and a third negative lens having an aspheric surface, wherein a total of three lens elements are used, the image-formation optical system satisfying the following condition:

$$0.98 < \Sigma d/f < 1.20 \qquad (1-1)$$

where $\Sigma d$ is a distance on an optical axis of the image-formation optical system from an object side-surface of the first positive meniscus lens to an image plane side-surface of the third negative lens, and f is a focal length of the image-formation optical system.

28. An image-formation optical system comprising, in order from an object side thereof, an aperture stop, a first positive meniscus lens convex on an object side thereof, a second positive lens having an aspheric surface and a third negative lens having an aspheric surface, wherein a total of three lens elements are used, the image-formation optical system satisfying the following condition:

$$0.32 < r_1/f < 0.55 \qquad (2-1)$$

where $r_1$ is a radius of curvature on an optical axis of an object side-surface of the first positive meniscus lens, and f is a focal length of the image-formation optical system.

29. An image-formation optical system comprising, in order from an object side thereof, an aperture stop, a first positive meniscus lens convex on an object side thereof, a second positive lens having an aspheric surface and a third negative lens having an aspheric surface, wherein a total of three lens elements are used, the image-formation optical system satisfying the following condition:

$$0.53 < |f_{12}/f_3| < 0.96 \qquad (3-1)$$

where $f_{12}$ is a composite focal length of the first positive meniscus lens and the second positive lens, and $f_3$ is a focal length of the third negative lens.

30. An image-formation optical system comprising, in order from an object side thereof, an aperture stop, a first positive meniscus lens convex on an object side thereof, a second positive lens having an aspheric surface and a third negative lens having an aspheric surface, wherein a total of three lens elements are used, the image-formation optical system satisfying the following condition:

$$0.75 < |f_3|/f < 1.3 \qquad (4-1)$$

where $f_3$ is a focal length of the third negative lens, and f is a focal length of the image-formation optical system.

31. An image-formation optical system comprising, in order from an object side thereof, an aperture stop, a first positive meniscus lens convex on an object side thereof, a second positive lens having an aspheric surface and a third negative lens having an aspheric surface, wherein a total of three lens elements are used, the image-formation optical system satisfying the following condition:

$$-0.8 < EXP/f < -0.6 \qquad (5-1)$$

where EXP is a paraxial exit pupil position as determined on the basis of an image-formation position of the image-formation optical system relative to an object point at infinity, and f is a focal length of the image-formation optical system.

32. An image-formation optical system comprising, in order from an object side thereof, an aperture stop, a first positive meniscus lens convex on an object side thereof, a second positive lens having an aspheric surface and a third negative lens having an aspheric surface, wherein a total of three lens elements are used, the image-formation optical system satisfying the following condition:

$$55° < 2\omega < 70° \qquad (6)$$

where $\omega$ is a half angle of view, and $2\omega$ is a total angle of view; and an electronic image pickup device located on an image side of said optical system.

33. An image-formation optical system comprising, in order from an object side thereof, an aperture stop, a first positive meniscus lens convex on an object side thereof, a second positive lens having an aspheric surface and a third negative lens having an aspheric surface, wherein a total of three lens elements are used, the image-formation optical system satisfying the following condition:

$$60° < 2\omega < 67° \qquad (6-1)$$

where $\omega$ is a half angle of view, and $2\omega$ is a total angle of view; and an electronic image pickup device located on an image side of said optical system.

* * * * *